United States Patent
Ghaemi et al.

(10) Patent No.: US 10,673,273 B2
(45) Date of Patent: *Jun. 2, 2020

(54) DISTRIBUTED LEDGER BASED CONTROL OF LARGE-SCALE, POWER GRID ENERGY RESOURCES

(71) Applicant: General Electric Company, Schenectady, NY (US)

(72) Inventors: Reza Ghaemi, Watervliet, NY (US); Xuefei Li, San Ramon, CA (US); Benjamin Edward Beckmann, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/983,668

(22) Filed: May 18, 2018

(65) Prior Publication Data

US 2019/0356164 A1 Nov. 21, 2019

(51) Int. Cl.
*H02J 13/00* (2006.01)
*G05B 13/04* (2006.01)
(Continued)

(52) U.S. Cl.
CPC .......... *H02J 13/0006* (2013.01); *F24F 11/30* (2018.01); *G05B 13/048* (2013.01);
(Continued)

(58) Field of Classification Search
CPC ........ H02J 13/0006; H02J 3/383; H02J 3/386; F24F 11/30; F24F 2140/60;
(Continued)

(56) References Cited

U.S. PATENT DOCUMENTS

| 6,439,469 | B1* | 8/2002 | Gruber | G05B 13/048 |
| | | | | 236/78 D |
| 7,660,649 | B1* | 2/2010 | Hope | G06Q 10/04 |
| | | | | 700/28 |

(Continued)

FOREIGN PATENT DOCUMENTS

| WO | 2017032541 A1 | 3/2017 |
| WO | 2017091530 A1 | 6/2017 |
| WO | 2017199053 A1 | 11/2017 |

OTHER PUBLICATIONS

Boyd, Stephen et al., "Distributed Optimization and Statistical Learning via the Alternating Direction Method of Multipliers", Foundations and Trends in Machine Learning, Volume: 3, Issue: 1, Jul. 26, 2011, DOI: 10.1561/2200000016, (pp. 1-125, 125 total pages).

(Continued)

*Primary Examiner* — Christopher E. Everett
(74) *Attorney, Agent, or Firm* — Fletcher Yoder, P.C.

(57) ABSTRACT

Some embodiments may provide a distributed optimization technology for the control of aggregation of distributed flexibility resource nodes (e.g., associated with distributed energy resources) that operates iteratively until a commanded power profile is produced by aggregated loads. Some embodiments use a distributed iterative solution in which each node solves a local optimization problem with local constraints and states, while using global qualities (e.g., associated with a Lagrange multiplier) that are based upon information from each other node. The global qualities may be determined via a secure, distributed transaction ledger (e.g., associated with blockchain) using DER-specific information obtained in a condensed form (e.g., a scalar or vector) from each node at each iteration. The global qualities may be broadcast to the nodes for each new iteration. Embodiments may provide an iterative, distributed solution (Continued)

to the network optimization problem of aggregated load power tracking.

24 Claims, 14 Drawing Sheets

(51) Int. Cl.
    *F24F 11/30*     (2018.01)
    *F24F 140/50*     (2018.01)
    *H02J 3/38*     (2006.01)
    *F03D 9/25*     (2016.01)
    *F24F 140/60*     (2018.01)

(52) U.S. Cl.
    CPC ........ *F03D 9/255* (2017.02); *F05B 2270/337* (2013.01); *F24F 2140/50* (2018.01); *F24F 2140/60* (2018.01); *H02J 3/383* (2013.01); *H02J 3/386* (2013.01)

(58) Field of Classification Search
    CPC .... F24F 2140/50; G05B 13/048; F03D 9/255; F05B 2270/337
    See application file for complete search history.

(56) References Cited

U.S. PATENT DOCUMENTS

| | | | | |
|---|---|---|---|---|
| 8,359,124 B2* | 1/2013 | Zhou | .................... | G05B 13/024 |
| | | | | 700/276 |
| 8,457,802 B1* | 6/2013 | Steven | .................... | G06Q 10/00 |
| | | | | 700/291 |
| 2012/0029897 A1* | 2/2012 | Cherian | .................... | H02J 3/00 |
| | | | | 703/18 |
| 2013/0261823 A1* | 10/2013 | Krok | .................... | G05F 5/00 |
| | | | | 700/291 |
| 2014/0277599 A1* | 9/2014 | Pande | .................... | G06Q 50/06 |
| | | | | 700/22 |
| 2014/0337086 A1* | 11/2014 | Asenjo | .................... | G06Q 10/0635 |
| | | | | 705/7.28 |
| 2016/0284033 A1* | 9/2016 | Winand | .................... | G06Q 50/06 |
| 2016/0299918 A1 | 10/2016 | Ford | | |
| 2017/0103468 A1 | 4/2017 | Orsini et al. | | |
| 2017/0147026 A1* | 5/2017 | Forbes, Jr. | .................... | H02J 3/32 |
| 2017/0279774 A1 | 9/2017 | Booz et al. | | |
| 2018/0015838 A1 | 1/2018 | Miftakhov et al. | | |
| 2018/0138711 A1* | 5/2018 | Dall'Anese | .................... | H02J 3/46 |

OTHER PUBLICATIONS

Kraning, Matt et al., "Message Passing for Dynamic Network Energy Management", Optimization and Control, Apr. 5, 2012, (pp. 1-30, 30 total pages).

Zhao, Changhong et al., "Frequency-based load control in power systems", 2012 American Control Conference (ACC), Jun. 27-29, 2012, (pp. 4423-4430, 8 total pages).

Mallada, Enrique et al., "Optimal Load-Side Control for Frequency Regulation in Smart Grids", IEEE Transactions on Automatic Control, 2014, (pp. 731-738, 8 total pages).

Tatarenko, Tatiana et al., "Non-Convex Distributed Optimization", IEEE Transactions on Automatic Control, vol. 62, No. 8, Aug. 2017, (pp. 3744-3757, 14 total pages).

Munsing, Eric et al., "Blockchains for Decentralized Optimization of Energy Resources in Microgrid Networks", 2017 IEEE Conference on Control Technology and Applications (CCTA), Mauna Lani, Aug. 27-30, 2017, (pp. 2164-2171, 8 total pages).

Pop, Claudia et al., "Blockchain Based Decentralized Management of Demand Response Programs in Smart Energy Grids", Sensors, vol. 18, Issue: 1, 2018, DOI: 10.3390/s18010162, (pp. 1-21, 21 total pages).

* cited by examiner

DISTRIBUTED LEDGER BASED CONTROL OF LARGE-SCALE, POWER GRID ENERGY RESOURCES

TECHNICAL FIELD

This disclosure generally relates to distributed energy resource power grid control.

BACKGROUND

The power generation industry is transitioning from being mostly based on a small number of large centralized power plants to a diversified network that combines conventional power plants, renewable power generation (e.g., solar, wind and the like), energy storage and microgrids. Traditionally, power grids have been designed to accommodate variable load demand, in which central-station power plants at a transmission level provide services down to the industrial, commercial and residential end users at a distribution level.

As renewable energy is becoming a major contributor in meeting demand, the grid control system needs to provide more flexibility for power systems to compensate for the volatility of renewable energy. More particularly, due to uncertainties in renewable energy resource availability, renewable power generation cannot be accurately forecast (nor can it be completely absorbed by the power grid). Hence, renewable curtailment may be required to achieve demand response balance.

To facilitate the penetration of renewable power generation (such as wind turbines and solar panels) into the power grid, load-side control is used. In general, the purpose of load-side control is to attempt to optimize the collective power consumption of the loads (such as buildings), including to accommodate uncertainties in the renewable power generation. A goal may be for the loads to achieve a desired collective power, determined by renewable generation and grid conditions, while each load's quality of service is respected.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards solving a global optimization problem in a distributed fashion where Distributed Energy Resource ("DER") controllers (e.g., edge devices installed at the load level) share a condensed dataset with a group of secure ledgers. The ledgers may collectively use shared information from DER edge devices to calculate global quantities to share with all DERs so that DERs can use the global values to calculate an updated condensed dataset and update their estimate of optimal control action. This process may iteratively continue until convergence is detected at ledgers' level and DERs are informed accordingly. This may mean that the estimations of optimal control actions have converged to the optimal control actions and DERs actuate the optimal control actions upon receiving convergence signal. This iterative procedure may happen every sample time (e.g., one minute or any other time interval value). Once convergence happens, at each sample time, the aggregated power (collective power consumption) may be the same as desired collective power—or is sufficiently close to it—while all local constraints (such as limits on power consumption, room temperatures, etc.) are satisfied. The local control action may (or may not) be the power consumption. It might also be a room temperature set point, a chiller water temperature set point, a water level for a water pump load etc. Aspects comprise sending, by the secure, distributed transaction ledger, the global values calculated based on previously received condensed loads data to the respective DER controllers for use in adjusting respective local estimates of control action (such as power consumptions or other control actions including temperature set points) of the respective DER controllers and adjusting local estimate of control variables to get estimations of optimal control actions closer to the optimal control actions that collectively satisfy the specified aggregated control action level. The DER controllers may also adjust (update) the condensed dataset to be shared with ledgers in the next iteration. The secure, distributed transaction ledger may then receive respective updated condensed datasets from the respective DER controllers that update the respective condensed datasets, wherein the respective updated condensed datasets are based on the respective DER-specific information after the adjusting (updating) of the respective local control variables in respective step directions determined by the respective DER controllers. The secure, distributed transaction ledger may then determine, from the respective updated condensed datasets, whether the convergence to the global optimum solution is achieved. Convergence may depend in part on the respective DER controllers have satisfied the specified aggregated control action level to a defined extent, and (in response to determining that the specified aggregated control action level has not been satisfied to the defined extent) continue the process in an iterative fashion until an acceptable solution is reached.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
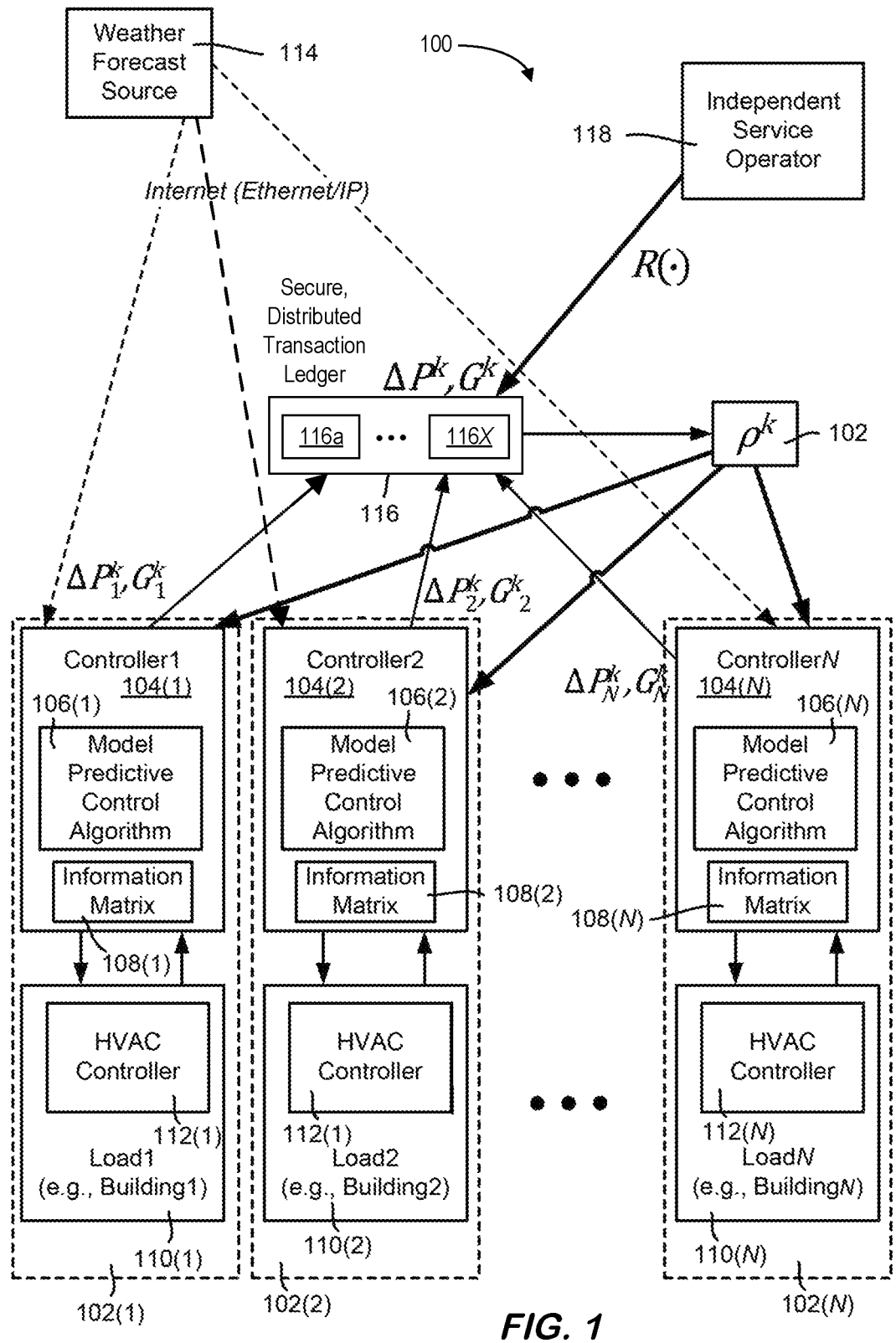
FIG. 1 is an example block diagram representation of an environment in which a secure, distributed transaction ledger load structure communicates with nodes corresponding to controlled loads, according to one or more example implementations.

Various aspects of the technology described herein are generally directed towards distributed load-side power control. In one or more aspects, the technology comprises a distributed optimization approach for control of an aggregation of Distributed Flexibility Resources ("DFRs") or Distributed Energy Resources ("DER"), which may be referred to as nodes, such that a commanded power profile (e.g., specified by an independent service operator) is produced by aggregated loads. In general, and as will be understood, the technology is based on a distributed iterative solution to solve a network utility maximization problem.

In general, each distributed flexibility resource node intends to operate optimally subject to local constraints and global constraint of aggregated power being equal to desired power. Each node (DER) calculates search direction at each device and updates the estimate of optimal control action using the calculated search direction and global quantities (such as step size and Lagrange multiplier associated with global power balance constraint) received from ledgers. To this end, the global qualities are calculated via a secure, distributed transaction ledger (e.g., a ledger utilizing blockchain technology) using information that is gathered from each node, with the newly calculated global qualities (such as, but not limited to, a Lagrange multiplier, associated with the constraint that requests that aggregated power needs to equal the command power generated by an independent service operator), broadcast to each node. According to some embodiments, nodes and/or other elements of the system may record information about load balancing so that further computations can be performed by the secure, distributed transaction ledger. According to some embodiments, the distributed ledger might be associated with the HYPERLEDGER® blockchain verification system or a similar arrangement.

The operations are iterative; each node uses the received global qualities to perform one iteration of an optimization algorithm that calculates the search direction using the given global qualities and sends updated information to the secure, distributed transaction ledger, which then recalculates new global qualities from the updated information, broadcasts the new global qualities to the nodes for a next optimization iteration, and so on, until the secure, distributed transaction ledger determines that a sufficient level (some defined level) of convergence is reached. This procedure is performed at each sample time and once convergence occurs, loads apply the computed optimal control.

The technology described herein solves the network optimization problem of power tracking of aggregated loads in a distributed fashion (both on the load side and the distributed ledger side). More particularly, solving a large scale optimization problem arising from the optimization of (on the order of) hundreds of thousands or even millions of loads in a centralized way is computationally infeasible, whereby traditional approaches are not able to handle local constraints of the loads and achieve aggregated power tracking performance. The technology described herein provides an iterative, distributed way of computing optimization that makes solving such a large scale optimization problem tractable.

It should be understood that any of the examples herein are non-limiting. As such, the technology described herein is not limited to any particular implementations, embodiments, aspects, concepts, structures, functionalities or examples described herein. Rather, any of the implementations, embodiments, aspects, concepts, structures, functionalities or examples described herein are non-limiting, and the technology may be used in various ways that provide benefits and advantages in power control concepts in general.

In general and as represented in FIG. 1, an environment 100 may contain a number of (distributed flexibility resource or DER) nodes 102(1)-102(N) are managed as described herein with respect to power control. There may be any practical number of nodes, possibly on the order of millions.

The represented nodes 102(1)-102(N), comprise controllers 104(1)-104(N) having model predictive control algorithms 106(1)-106(N) and information matrixes 108(1)-108(N) that describe the local states and constraints of the node. One example state is the local weather forecast obtained from a source 114 such as the National Oceanic and Atmospheric Administration (NOAA), as the weather influences renewable power source output as well as corresponds to how much power a node is likely to need for heating or cooling, for example. Other state that may be maintained may be room temperatures, zone temperatures, heating and cooling characteristics, time of day, day of week and so on.

The exemplified nodes 102(1)-102(N) are also represented in FIG. 1 as comprising loads 110(1)-110(N), which are further exemplified as being controllable by Heating, Ventilation and Air Conditioning ("HVAC") controllers 112(1)-112(N), respectively. A typical example of a load is a building, however it is understood that a building or the like may correspond to multiple, separate loads (e.g., separate nodes), and/or multiple buildings or the like may correspond to a single load (node).

The nodes 102(1)-102(N) are coupled via their respective controllers 104(1)-104(N) to a "secure, distributed transaction ledger" 116. As used herein, the phrase "secure, distributed transaction ledger" might refer to, for example, a system of individual ledgers 116a-116X, such as blockchains, each ledger 116a-116X being associated with a continuously growing list of records (e.g., blocks) that are linked and secured using cryptography. For example, each block in a ledger 116a-116X might contain a cryptographic hash of the previous block, a timestamp, transaction data, etc. As a result, each ledger 116a-116X may be resistant to modification of the data (because the original, correct data is stored in multiple locations). For use as a distributed ledger, each ledger 116a-116X may be managed as a peer-to-peer network collectively adhering to a protocol for inter-node communication and validating new blocks.

In general, and as described herein, the secure, distributed transaction ledger 116 receives a commanded power profile from an Independent Service Operator ("ISO") 118, and uses that information along with local load-specific information to compute a global Lagrange multiplier 120 mathematically represented by $\rho^k$ (at iteration k). Global Lagrange multipliers 120 computed by the secure, distributed transaction ledger 116 are sent to the controllers 104(1)-104(N), for use by each controller in solving its local optimization problem.

To summarize thus far, the technology is directed towards attempting to more optimally control distributed flexibility resource nodes, such that the aggregated power tracks a commanded power profile that comes from the independent service operator 118. The optimization problem is solved in a distributed way (on both the node side and the ledger side), where each distributed flexibility resource node exchanges data with the secure, distributed transaction ledger and performs one optimization iteration according to the distributed optimization scheme described herein to solve the global model predictive control optimization problem in a tractable fashion.

At the secure, distributed transaction ledger 116, the Lagrange multiplier is a function of the commanded power profile and the local data that are sent to the secure, distributed transaction ledger 116 at each iteration of optimization. The recalculated Lagrange multiplier is sent back to the nodes to be used in the cost for next iteration, and so on. As the nodes iterate synchronously, they converge towards an acceptable solution (that is, to a defined/predetermined convergence threshold) to the network/global Model Predictive Control ("MPC") optimization problem through the aforementioned iterative distributed computation scheme.

As represented 200 in FIG. 2, for an example a DER such as controller instance 204(1) (of a set of controller instances 204(1)-204(N)), the iterative distributed scheme can be described in the following operations, also exemplified in the flow diagram of FIG. 3. At a time to adjust, such as once per minute (operation 302 of FIG. 3), each of the controllers are initialized (represented by labeled arrows one (1) and two (2) in FIG. 2, and also by operation 304 of FIG. 3). In general, and as further described herein, the controller 204(1) sends its feasible power range to the secure, distributed transaction ledger 116, which then uses the feasible power ranges of the various controller instances 204(1)-204(N) to compute a ratio (e.g., a vector r) for each controller. This ratio is used to compute an initial power vector at each load (operation 304 of FIG. 3).

Figure 2:
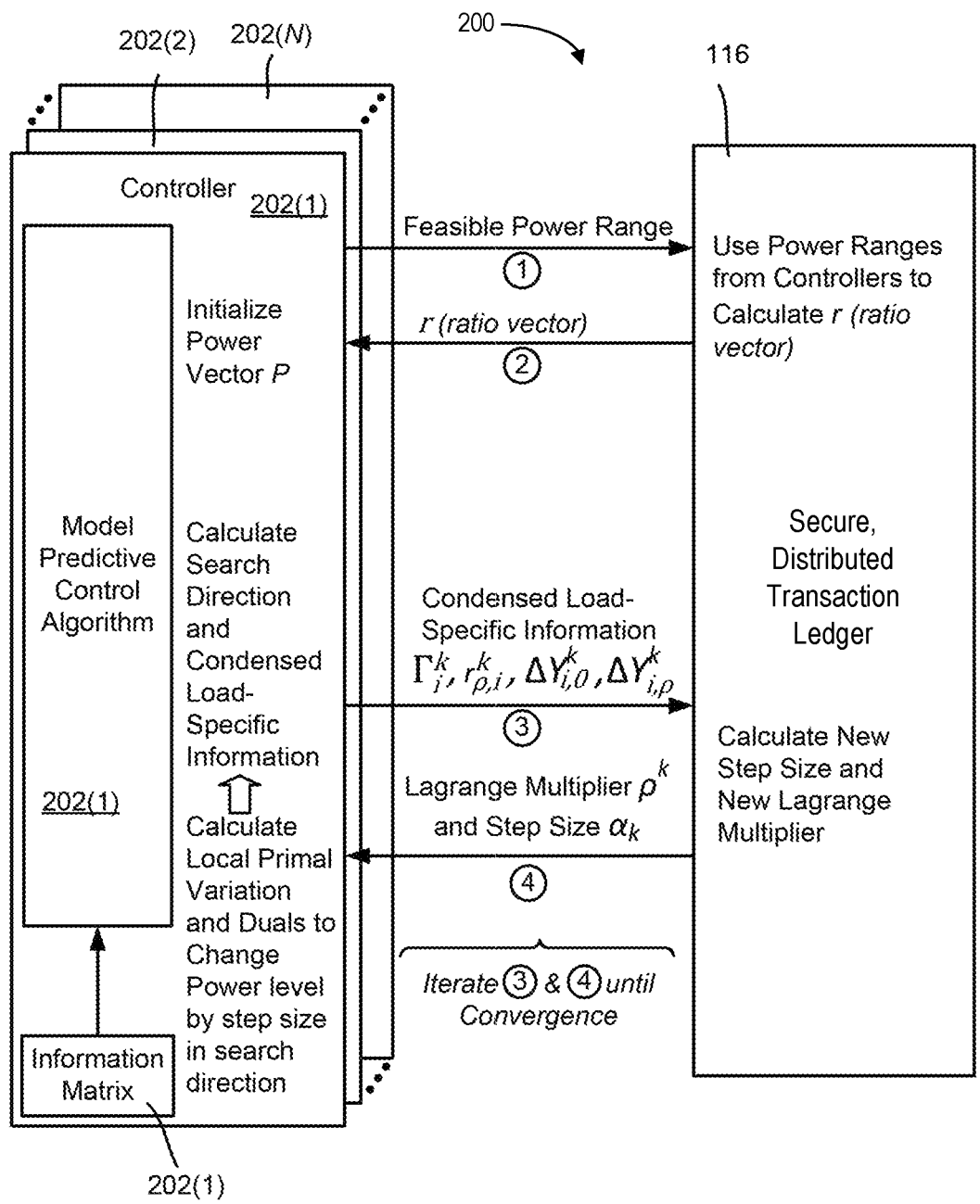
FIG. 2 is an example block/data flow diagram representing a controller communicating information with a secure, distributed transaction ledger to iteratively converge towards an optimal solution, according to one or more example implementations.
Figure 3:
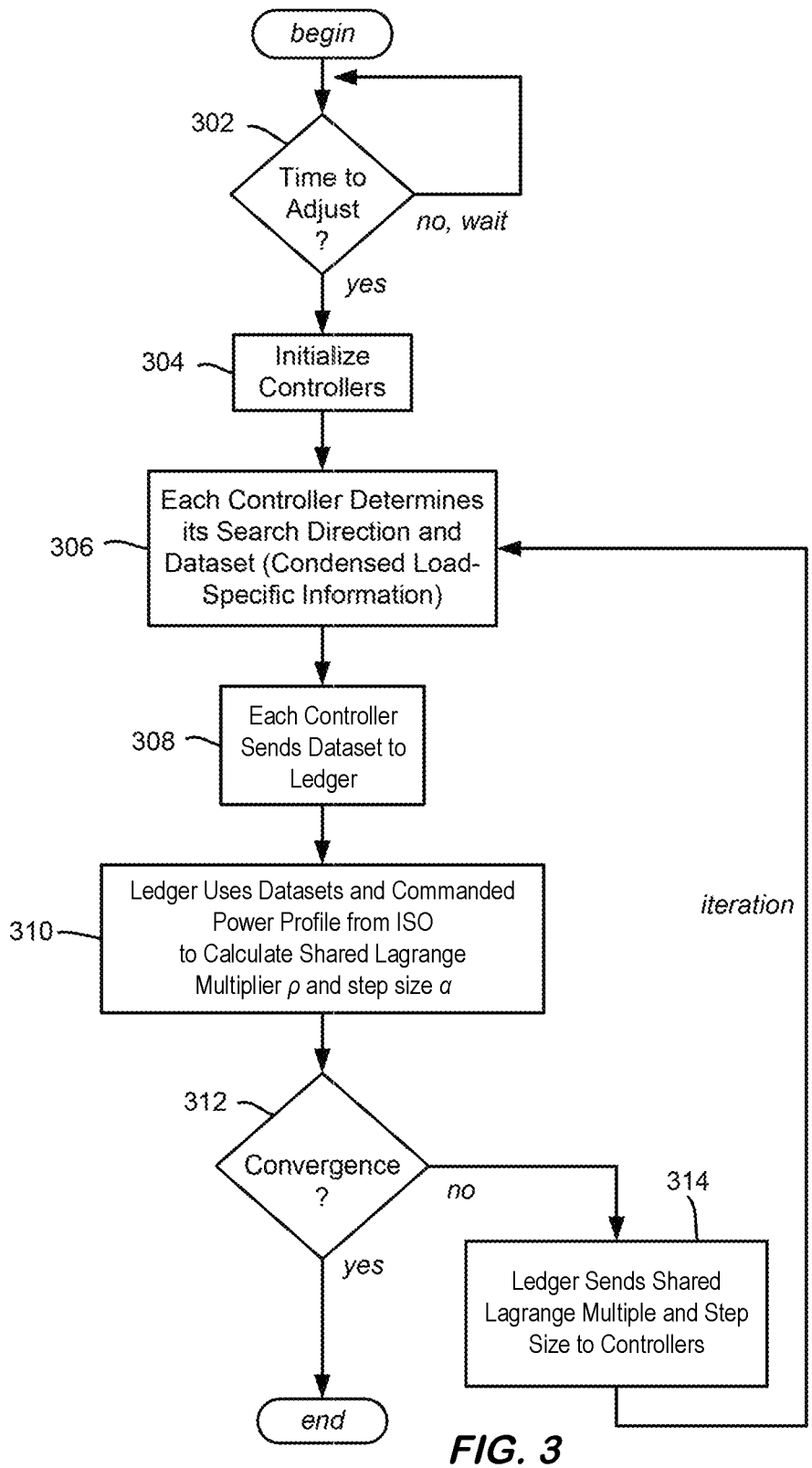
FIG. 3 is a flow diagram showing example operations of an iterative, distributed power control technology, according to one or more example implementations.

Once initialized, the communications represented by labeled arrows three (3) and four (4) in FIG. 2, and the operations 306, 308, 310, 312 and 314 of FIG. 3 are performed iteratively. At step 306, each controller solves the search direction for the local nonlinear programming problem as described below. As a side product, a set of data comprising load-specific information (a dataset in condensed form, e.g., as scalars or vectors) is also generated and sent to the secure, distributed transaction ledger 116 (arrow three (3) in FIG. 2, operation 308 in FIG. 3).

At the secure, distributed transaction ledger, at operation 310, using the data collected from the nodes and the commanded power profile from the independent service operator, the shared Lagrange multiplier is calculated, along with a step size. If convergence to the desired, defined level is not yet achieved (operation 312), the Lagrange multiplier and step size is sent to the nodes (arrow four (3) in FIG. 2 and operation 314 in FIG. 3).

Using the new value of the Lagrange multiplier (or other global quantity), a new search direction and an updated dataset is calculated by iteratively returning to step 306. The updated dataset is sent from the controller to the secure, distributed transaction ledger (arrow three (3) in FIG. 2 and operation 308 in FIG. 3). The secure, distributed transaction ledger computation at operation 310 and the broadcast to the nodes at operation 314 is repeated and so on, until the convergence is detected at operation 312. Note that intermediate values during the iterative process (e.g., after the initial value and before convergence) might not actually be implemented by a node. For example, a node (e.g., a DER controller) might make five intermediate steps prior to convergence at a final value. In this case, the intermediate values may exist only the node's memory storage (e.g., RAM). Only after the final value is determined (e.g., sufficient convergence occurs) will the node actually implement that value locally (e.g., setting a power consumption or production level as appropriate).

Turning to additional details, in one or more implementations, the distributed optimal control technology uses an algorithm based on a distributed computation of the Newton iteration, which provides faster convergence relative to other methods (such as alternating direction method of multipliers or sub-gradient methods). As will be understood, the distributed optimal control technology exploits a structure of the problem to calculate an exact Newton step as opposed to inexact versions that require iterations to calculate the Newton direction. The technology described herein coordinates loads and distributed energy resources, and exploits their flexibilities such that the aggregated energy follows the profile commanded by the ancillary services, where ancillary services are basically those functionalities provided by the power grid that support a continuous flow of power and work to guarantee that supply will meet demand.

For each load, an optimization problem is defined essentially as a local model predictive control formulation. The cost represents local objectives, and constraints are determined by dynamics and other operational and Quality of Service ("QoS") constraint or constraints on states and inputs of the systems; e.g., temperate comfort interval may be a QoS constraint. The power tracking constraint is generally the only system-level constraint that couples the local subsystem-level optimization problems. Hence, it leads to a global optimization problem whose solution meets local objectives and constraints, and at the same time provides total power that follows the power profile demanded by the ancillary services.

Defined herein is a global optimization problem, along with an algorithm that is scalable and can efficiently solve the problem in a distributed manner. The solution calculates Newton steps (e.g., exact Newton steps) and step size in a distributed fashion in the sense that at the load, load-level information related to the step size is calculated and sent to the secure, distributed transaction ledger, and at the secure, distributed transaction ledger level, the step size is calculated using that information, so that while the solution enjoys fast convergence of Newton primal iterations, it is also scalable to a large number of DERs (such as loads, photovoltaic panels, electric vehicles, etc.).

Consider a network of loads and differential algebraic equations as represented by a set $\mathcal{L}=\{L_1, \ldots, L_N\}$. For each load there are states and inputs that define the dynamic of the load that are usually defined by a set of differential algebraic equations. Differential algebraic equations are converted to discrete time equations to construct equality constraints for numerical optimization. Constraints on inputs or state form another set of equality and inequality constraints. The local optimization problem that formulates model predictive control for the load $L_i \in \mathcal{L}$ is characterized as $$\min_{X_i} f_i(X_i) \tag{1}$$

$$\text{s.t. } g_i(x_i) \leq 0$$

$$h_i(X_i) = 0$$

$$P_i = m_i(X_i)$$

where $X_i$ is the vector containing states, inputs and algebraic variables over the prediction horizon, $f_i$ is the local cost function of the optimization problem, $h_i$ and $g_i$ are the functions characterizing equality constraint containing discrete-time dynamics and other constraints imposed due to physics or stability of the load. $P_i$ is the vector representing the power dispatched over the prediction horizon and $m_i$ is the map from $X_i$ to $P_i$. The power tracking constraint $$P_d = \sum_{i=1}^{N} P_i \tag{2}$$

is imposed to make the aggregated power follow the target power Pa, where Pa is the vector containing the desired power profile over the prediction horizon. Local optimization problems subject to the global constraint construct the following optimization problem:

$$\min_{\{X_i, i=1,\ldots,N\}} \sum_i f_i(X_i) \tag{3a}$$

$$\text{such that } g_i(x_i) \leq 0 \tag{3b}$$

$$h_i(X_i) = 0 \tag{3c}$$

$$P_i = m_i(X_i) \tag{3d}$$

$$P_d = \sum_{i=1}^{N} P_i \tag{3e}$$

The optimization problem defines a global model predictive control framework where the problem is solved iteratively to determine an optimal control sequence for each load such that the control sequence optimizes the local objective subject to local dynamics and constraints, while the aggregated dispatched power by the loads track the desired power profile determined by any ancillary services. The first element of the optimal control sequence for each load is implemented at each sample time.

As described herein, an assumption is that the functions $g_i$, $h_i$ and $m_i$ are linear and the functions $f_i$ are self-concordant. The problem may be reformulated to one with only an equality constraint by introducing a non-negative slack vector $S_i \geq 0$ such that $g_i(X_i) + S_i = 0$, and logarithmic barrier functions of slack variables. Then define $Y_i := [X_i^T, S_i^T]^T$, $E(Y_i) := [(g_i(X_i) + S_i)^T], (h_i(X_i))^T$, $M_i(Y_i) := m_i(X_i)$ and $F_i(Y_i, \mu) := f_i(X_i) + \mu(br(S_i))$ where the barrier function of the vector $S_i$, $br(S_i)$, is defined as $br(S_i) = \sum_{j=1}^{|S_i|} -\log S_j^i$, wherein $S_i = S_i^1, \ldots, S_i^{|S_i|}$, $|S_i|$ is the dimension of the vector $S_i$, and $\mu \leq 1$ is the positive coefficient of the barrier functions. Because $E_i$ and $M_i$ are affine functions they can be written as $E_i(Y_i) = A_i Y_i - b_i$ and $M_i(Y_i) = C_i Y_i - d_i$. Hence, the problem is in the following form:

$$\min_{\{Y_i, i=1,\ldots,N\}} \sum_i f_i(Y_i) \tag{4a}$$

$$\text{s.t. } A_i(Y_i) = b_i \tag{4b}$$

$$P_i = C_i Y_i - d_i \tag{4c}$$

$$P_d = \sum_{i=1}^{N} P_i \tag{4d}$$

An assumption is that the matrix $[A_i^T, C_i^T]^T$ is full row rank; it is straightforward to prove that this holds for large class of systems, if in the subsystem $L_i$, the power is an input of the system and (eq. 3c) represents the linear dynamic of the system.

Moreover, let $J(Y) := \Sigma_i F_i(Y_i)$ where $J$ denotes the objective function and $Y$ is the concatenation of $Y_i$, $i=1, \ldots, N$. The matrices and vectors A, b, C and d are defined with appropriate dimensions such that AY-b and $P_d$=CY+d represent the equality constraints.

Therefore, the optimization problem may be written as $$\min_Y J(Y) \tag{5a}$$

$$\text{such that } AY = b \tag{5b}$$

$$P_d = CY + d \tag{5c}$$

Described herein is a distributed optimization scheme to solve the above optimization problem. The scheme is based on the equality constrained Newton method, where the Newton direction and step size are calculated in a distributed fashion using data communication between a secure, distributed transaction ledger and the loads.

Define $\{Y^k\}$ as the sequence of primal vectors and $\{\lambda^k\}$ the sequence of dual variables associated with constraints (eq. 5b), and $\{\rho^k\}$ the sequence of dual variables associated with the power balance constraint (eq. 5c), generated by Newton iterations. The algorithm updates the sequence of primal vectors by $$Y^{k+1} = Y^k + \alpha_k \Delta Y^k \tag{6}$$

where $0 \leq \alpha_k \leq 1$ and $\Delta Y^k$ is the Newton search direction given by $$H^k \Delta Y^k + A^T \lambda + C^T \rho = -\nabla_Y J(Y^k)$$

$$A \Delta Y = 0$$

$$C \Delta Y = 0 \tag{7}$$

where $H^k := \nabla^2 J(Y^k)$. It is desired to solve (eq. 7) in a distributed fashion that is scalable such that it can be deployed for very large number of loads. To this end, described herein is exploiting the special sparsity of the problem to explicitly calculate the search direction. The following theorem enables the development of a distributed iterative algorithm to the calculate Newton search direction.

Assume the optimization problem set forth above is strictly feasible. Given primal vectors $Y_i$, $i=1, \ldots, N$, the Lagrange multiplier associated with the power tracking constraint (5c) is set forth in (7) is given by $$\rho^k = -\Gamma^{k-1} r_\rho^k \qquad (8)$$

where $$\Gamma^k := \sum_{i=1}^{N} [C_i \ 0](K_i^k)^{-1} \begin{bmatrix} C_i^T \\ 0 \end{bmatrix}, \qquad (9)$$

$$r_\rho^k := \sum_{i=1}^{N} [C_i \ 0](K_i^k)^{-1} \begin{bmatrix} \nabla_{Y_i} F_i(Y_i) \\ 0 \end{bmatrix}, \qquad (10)$$

and $$K_i^k := \begin{bmatrix} H_i^k & A_i^T \\ A_i & 0 \end{bmatrix}$$

is the local KKT (Karush-Kuhn-Tucker) matrix. Moreover, $\Delta Y_i^k$ and $\lambda_i^k$ are calculated as $$\begin{bmatrix} \Delta Y_i^k \\ \lambda_i^k \end{bmatrix} = -(K_i^k)^{-1} \begin{bmatrix} C_i^T \\ 0 \end{bmatrix} \rho^k - (K_i^k)^{-1} \begin{bmatrix} \nabla_{Y_i} F_i(Y_i) \\ 0 \end{bmatrix}, \qquad (11)$$

where the matrix and vector 0 are with appropriate dimensions.

To be able to implement primal vector update (eq. 6), the value of $\alpha_k$ needs to be calculated. The step size is determined by the Newton decrement (ND), defined as $$ND(Y^k) := \sqrt{Y_k^T H_k \Delta Y_k}. \qquad (12)$$

ND can be written in terms of local information $Y_i^k$ as $$ND(Y^k) = \sqrt{\sum_i \Delta Y_i^{kT} H_i^k \Delta Y_i^k} \qquad (13)$$

The step size $\alpha_k$ then is calculated as a function of ND as follows:

$$\alpha_k = \begin{cases} \dfrac{1}{ND(Y^k)+1} & \text{if } ND(Y^k) \geq 1 \\ 1 & \text{otherwise} \end{cases} \qquad (14)$$

Because the cost function J(Y) is self-concordant and the constraints are linear, the step size calculated according to (eq. 14) provides linear and then quadratic convergence to the optimal solution in two stages. Described herein is having the Newton direction $Y^k$ and step size $\alpha_k$ calculated in a distributed fashion at the secure, distributed transaction ledger using the data gathered by communication between the secure, distributed transaction ledger and loads.

FIGS. 1 and 2 describe the communication structure of the secure, distributed transaction ledger and nodes through which the Newton direction and step size are calculated. In one or more implementations, as described in FIG. 3, the operations occur in two general stages. A first stage is feasible initialization, described herein with reference to the example flow diagrams of FIG. 4 (the secure, distributed transaction ledger initialization-related operations) and FIG. 6 (the controller initialization-related operations), where each load is initialized by the power that is locally feasible and satisfies the power balance constraint (eq. 5c). A second stage is optimization iterations, described herein with reference to the example flow diagrams of FIG. 5 (the secure, distributed transaction ledger optimization-related operations) and FIG. 7 (the controller optimization-related operations).

Figure 4:
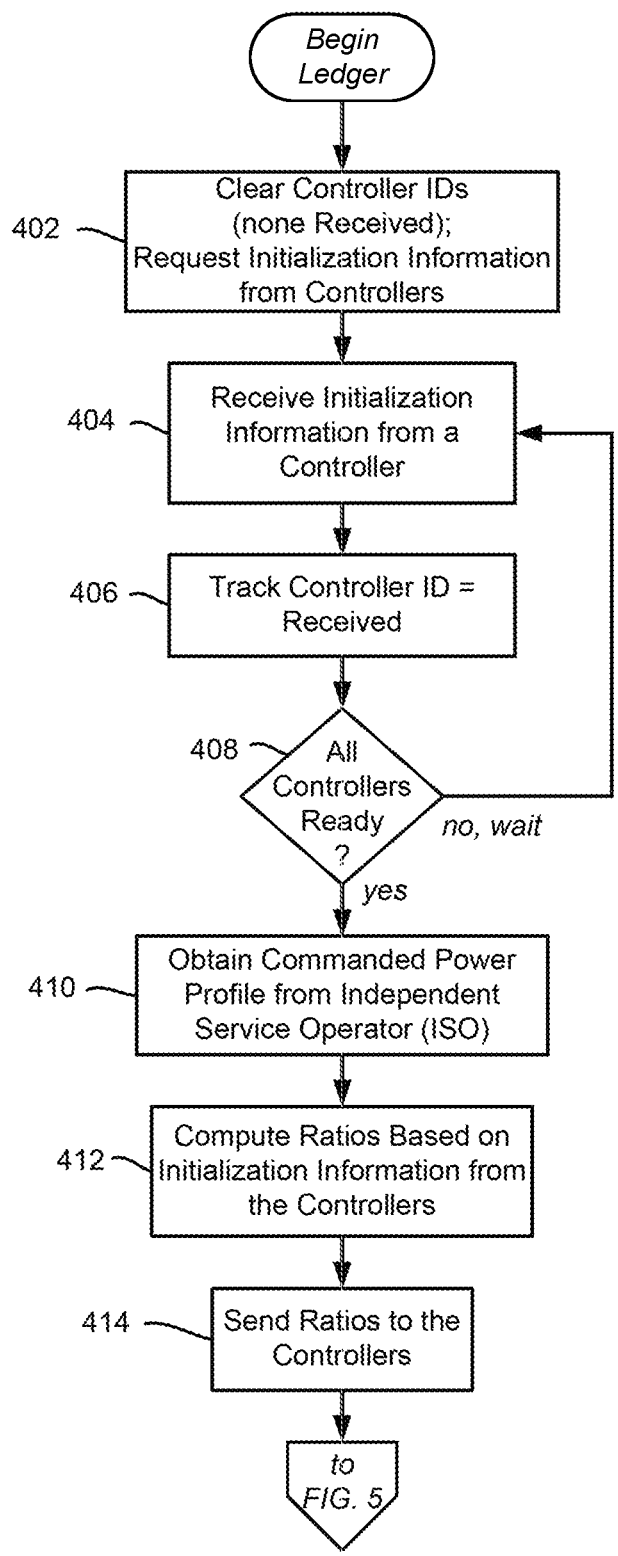
FIGS. 4 and 5 comprise a flow diagram showing example operations of a secure, distributed transaction ledger, according to one or more example implementations.
Figure 6:
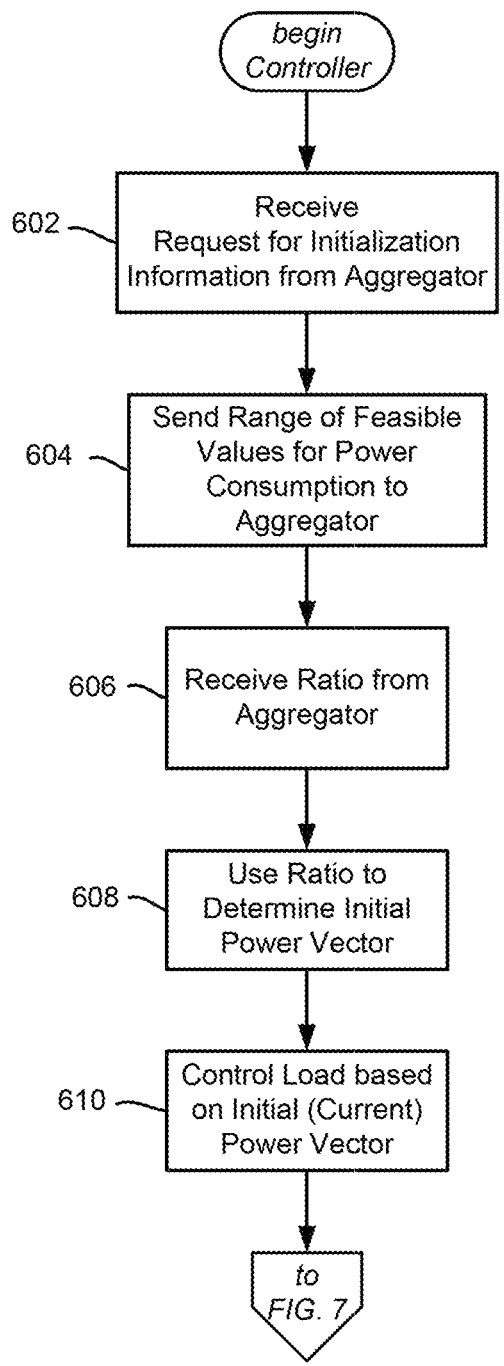
FIGS. 6 and 7 comprise a flow diagram showing example operations of a per-load distributed controller, according to one or more example implementations.

The initialization phase may, in one or more implementations, be started by the secure, distributed transaction ledger initializing itself and requesting that each controller provide power feasible information (operation 402 of FIG. 4 and operation 602 of FIG. 6).

For each load $L_i \in \mathcal{L}$, a range (interval) $[p_{min}^i, p_{max}^j]$ is assumed which defines the feasible values for power consumption. Hence, each of the loads sends its respective upper and lower limit of the power feasible range to the secure, distributed transaction ledger (operation 604 of FIG. 6).

Operations 404, 406 and 408 of FIG. 4 represent collecting the initial range information from each of the controllers. When the range information is received at the secure, distributed transaction ledger from the controllers, $P_{min} = \Sigma_i p_{min}^i$ and $P_{max} = \Sigma_i p_{max}^i$ are calculated; (note that it is feasible to begin summing before each of the controllers has responded). Further note that if the desired values of some elements of $P_d$ do not belong to $[P_{min}, P_{max}]$ then the constraint (eq. 5c) is not feasible. Otherwise, assuming $p_d^j$ being the j-th element of $P_d$, the ratio vector r is calculated as $$r_j := \frac{p_d^j - P_{min}}{P_{max} - P_{min}}$$

where $r_j$ is the j-th element of r. The value of r is then sent to the controllers, which may differ per controller. Note that the value of r corresponds to the target power obtained from the independent service operator, (operation 410), which may be obtained independently at any suitable time before the ratios are computed and sent (operations 412 and 414).

When the ratio vector is received by a controller (operation 606 of FIG. 6), at each load $L_i$, the power vector $P_i$ is initialized by setting the j-th element of it as $P_i^j = p_{min}^i + r_j (p_{max}^i - p_{min}^i)$ (operation 608 of FIG. 6). The controlling of the load based upon this initial power vector (which is the current power vector at this time) is represented by operation 610 of FIG. 6.

It can be easily shown that the sequence $\{P_i\}$ provides feasible power vectors for the loads $L_i \in \mathcal{L}$ and it satisfies the constraint 5c.

Figure 5:
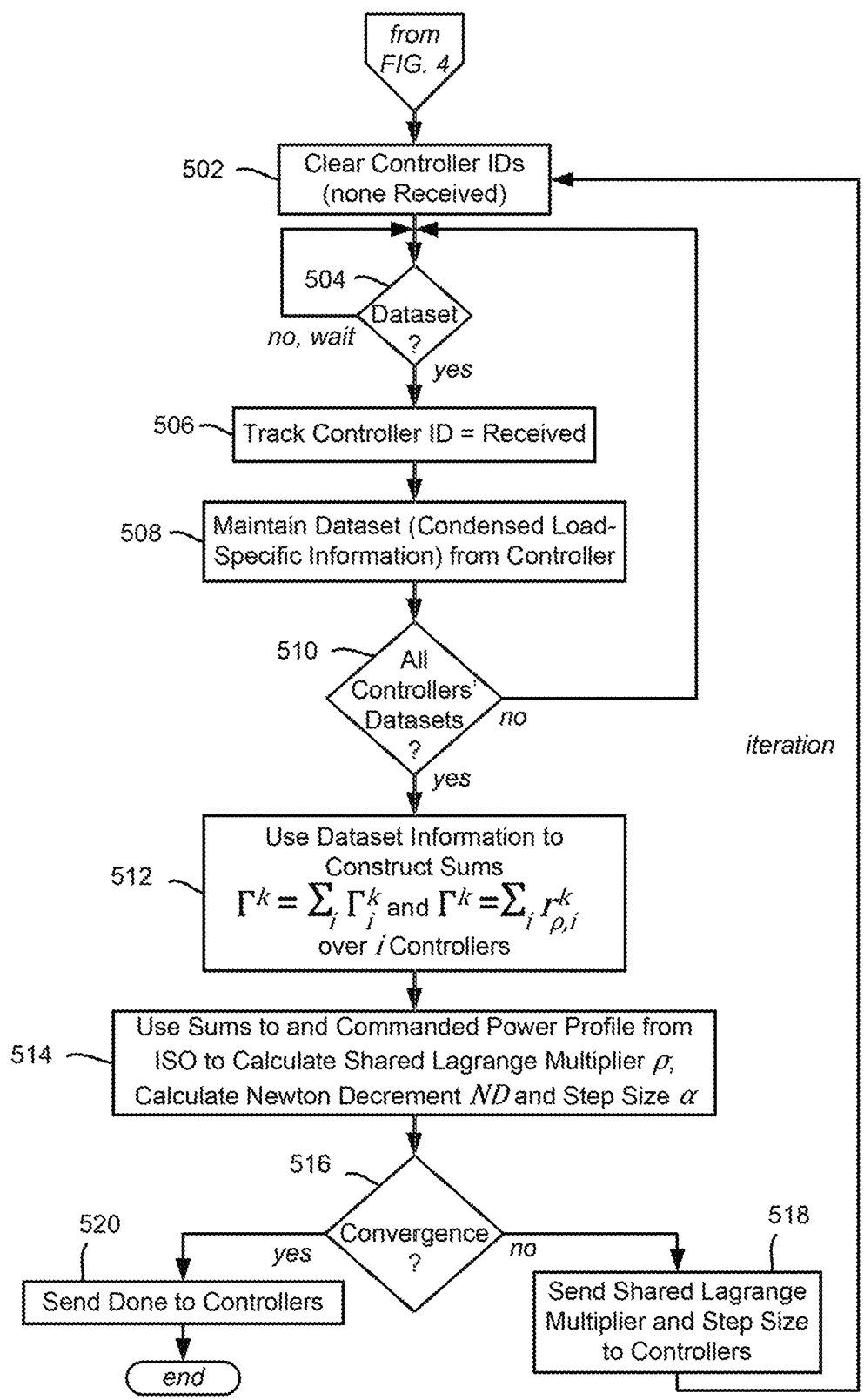
Figure 7:
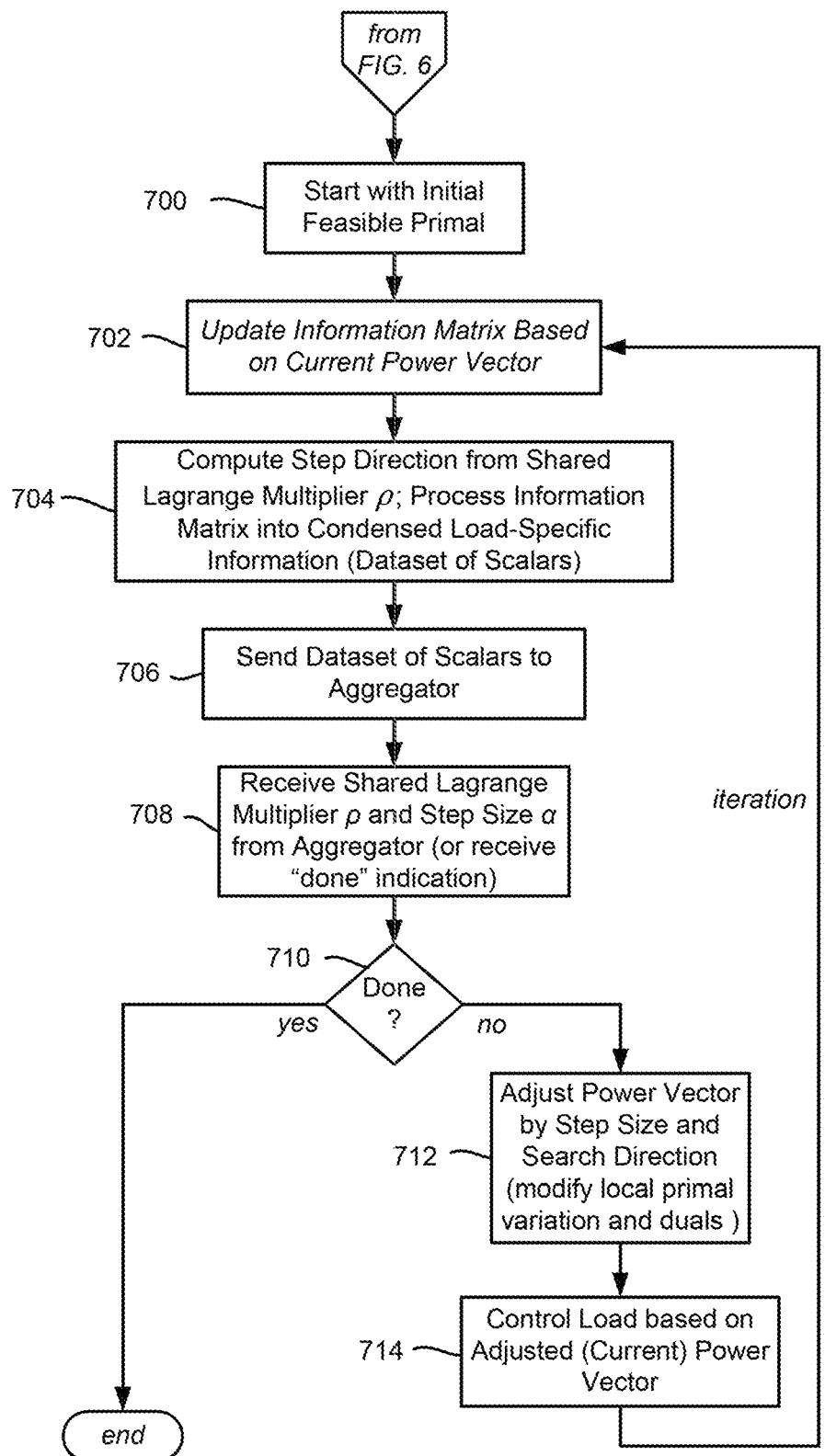

The optimization phase is described herein with reference to the example flow diagrams of FIG. 5 (the secure, distributed transaction ledger optimization-related operations) and FIG. 7 (the controller optimization-related operations). For example, the secure, distributed transaction ledger clears its tracking information (that assures each controller reports its data) and waits for the controllers to begin sending their datasets until each is received, as represented by operations 502, 504, 506 and 508 of FIG. 5.

Each controller starts with its own initial feasible primal $Y^0$ (e.g., operation 700 of FIG. 7, not part of the iterations).

Note that operation 702 represents updating the information matrix for that node, which may occur independent of any controller operations, e.g., as the power vector changes.

At each load $L_i$, operation 704 is performed, which calculates the step direction and also generates the scalars or vectors that represent the information matrix in condensed for, e.g., $\Gamma_i^k$, $r_{\rho,i}^k$, $a_i^k := \Delta Y_{i,\rho}^{kT} H_i^k \Delta Y_{i,\rho}^k$, $b_i^k := \Delta Y_{i,\rho}^{kT} H_i^k \Delta Y_{i,0}^k$, and $c_i^k := \Delta Y_{i,0}^{kT} H_i^k \Delta Y_{i,0}^k$, where $$\Gamma_i^k := [C_i \ 0](K_i^k)^{-1} \begin{bmatrix} C_i^T \\ 0 \end{bmatrix} \quad (15)$$

(a surrogate for sensitivity of power with respect to in Lagrange multiplier $\rho$);

$$r_{\rho,i}^k := [C_i \ 0](K_i^k)^{-1} \begin{bmatrix} \nabla_{Y_i} F_i(Y_i) \\ 0 \end{bmatrix}$$

(representing the optimal change of power once $\rho = 0$);

$$\Delta Y_{i,0}^k := [I \ 0](K_i^k)^{-1} \begin{bmatrix} C_i^T \\ 0 \end{bmatrix};$$

(representing the sensitivity of the local search direction with respect to $\rho$);

$$\Delta Y_{i,\rho}^k := [I \ 0](K_i^k)^{-1} \begin{bmatrix} \nabla_{Y_i} F_i(Y_i) \\ 0 \end{bmatrix}$$

(representing the local search direction once $\rho = 0$).

These per-node dependent values are sent to the secure, distributed transaction ledger by each controller at operation 706 of FIG. 7.

The secure, distributed transaction ledger, as represented by operation 512 of FIG. 5, constructs $\Gamma^k = \Sigma_i \Gamma_i^k$ and $r_\rho^k = \Sigma_i r_{\rho,i}^k$, note that the summations may begin before each controller has reported its dataset. The secure, distributed transaction ledger, as represented by operation 514 of FIG. 5, calculates $\rho^k$ using (eq. 8), calculates the Newton decrement, $ND(Y^k) = \sqrt{\Sigma_i(a_i^k \rho^{k^2} + 2b_i^k \rho^k + c_i^k)}$, and calculates $\alpha_k$ according to (15). If the value of $ND(Y^k)$ is sufficiently small, as based upon a predefined convergence level, operation 516 terminates the iterations. Otherwise, operation 518 sends $\rho^k$ and $\alpha_k$ to the controllers.

At each controller, if $\rho^k$ and $\alpha_k$ are received (operations 708 and 710 of FIG. 7), $\rho^k$ and $\alpha_k$ are used to calculate the local primal variation and duals according to (eq. 11) and update the primal according to (eq. 6); (operation 712 of FIG. 7. This changes the power control of the load (step 714). Note that operation 710 represents receiving a "done" indication from the secure, distributed transaction ledger, which is not strictly necessary if operation 708 does not receive anything further, until operation 602 restarts the next controller initialization.

Turning to another aspect, some loads have discrete power consumption, that is, are either on or off (in contrast to loads that accept continuous values for power control). Described herein is an algorithm that can handle loads that only accept boundary values of the power feasible interval (assuming the interval is the range from minimum to maximum). Thus, the power only accepts discrete values, e.g., $p_i \in \{p_{min}^i, p_{max}^i\}$ for the loads $L_i \in \mathcal{L}_d \subset \mathcal{L}$. A general goal here is to avoid mixed-integer programming, which is often not suitable for real time optimization, especially for large scale problems.

To this end, the optimization problem is first solved according to the algorithm assuming all the loads accept continuous values for power within the feasible interval. Let $\{\overline{P}_i\}$ be the sequence of optimal power vectors and $P_{dsc} := \Sigma_{L_i \in \mathcal{L}_d} \overline{P}_i$ be the power consumed by loads with discrete power consumption. Further, let $N_{dsc} = |\mathcal{L}_d|$ be number of the loads with discrete power input. The following algorithm turns the value of elements of $\overline{P}_i$ to $p_{max}^i$ of $p_{min}^i$ so that the desired power $P_d$ is tracked as close as possible while the power values closer to maximum have higher priority to be switched to $p_{max}^j$.

Via operations 802, 806 and 808, for each element j, which represents the j-th step in the prediction horizon, operation 804 sorts the sequence $$\left\{ \frac{p_{max}^i - \overline{P}_i^j}{p_{max}^i - p_{min}^i} \right\}$$

and denotes it by $\{\hat{P}_i^j\}$. Also, operation 804 denotes the corresponding sequence of the load numbers by I.

Operation 810 finds the maximum value of $n_j$ such that $\Sigma_{i=1}^{n_j} P_{max}^{I_i} \leq P_d^j$. Operation 812 sets $P_{I_k}^j = p_{max}^{I_k}$, for k=1, ..., $n_j$ and sets the rest to $p_{max}^{I_k}$.

Combining the continuous load optimization with the above-described discrete load post-processing allows the technology to handle any mixture of continuous and discrete loads. The effectiveness of the proposed distributed optimal control scheme may be shown via a numerical simulation, e.g., considering 100 buildings as the distributed loads. Each building is individually controlled by its own HVAC control system. Each building may have single or multiple Roof Top Units ("RTUs") managed by a single controller, or multiple controllers through a Building Management System ("BMS"). Each building communicates with a secure, distributed transaction ledger, e.g., via a controller as described herein. As described herein, a main job of the distributed optimal controller is to compute power set points to each building such that the sum of powers consumed by the buildings track the power set point commanded by the grid Independent Service Operator ("ISO"), while keeping each building temperature within the defined comfort zone to the extent possible. The thermal dynamics of the i-th building may be modeled using an equivalent RC circuit, as:

$$C_i \frac{d\tau_i}{dt} = -\frac{\tau_i - \tau_i^0}{R_i} - P_i, \quad (16)$$

where $P_i$ is the input power, $\tau_i^0$ is the ambient temperature [80° F.], $R_i$ is the thermal resistance [2.5° C./kW], $C_i$ is the thermal capacitance [1.5 kW h/C] and $P_{max_i}$ is the maximum power consumption [7.2 kW].

The above parameters represent a nominal load model. The load parameters may be stochastically perturbed to account for model uncertainties in different buildings. At the abstraction level from the secure, distributed transaction ledger's perspective, this RC model captures the building dynamics well, while keeping the computations tractable for a larger number of loads. It can be reasonably assumed that the dynamics of the HVAC controller is much faster than the thermal dynamics of the building, and can be neglected in this context. Further, assume the loads are of the same dynamic time scale and that the communication delays between loads and the secure, distributed transaction ledger are negligible. While older buildings have ON-OFF HVAC controllers, thus making them a discrete load, most newer buildings are equipped with either Variable Air Volume ("VAV") handling, or electronic expansion valves in the HVAC refrigeration cycle, making them a continuously controllable load. For continuous loads, the power set point at each instant can be any number between 0 and $P_{max}$. For discrete loads, the power at each instant is either 0 (OFF mode) or $P_{max}$ (ON mode), and there is also a hysteresis mechanism, such as with the minimum on and off times as follows:

MIN-OFF-TIME=4 mins
MIN-ON-TIME=6 mins, which means that once the HVAC is OFF is remains OFF for at least 4 minutes, and once it is turned ON, it remains ON for at least 6 minutes. In order to accommodate both newer and older buildings, in these example simulations, fifty loads are randomly selected as continuous and the remaining fifty loads as discrete. The loads are simulated with random and different initial temperatures. The thermal comfort zone is defined to be between 75° F. and 79° F. and is penalized using a log barrier in the optimization overall cost function. A load is referred to as "active" if the load is available for control. Continuous loads are virtually always available, while discrete loads are only available if their status is changeable, i.e. they are not within their time hysteresis region.

At each time step, an interior point optimization problem is solved in a distributed fashion as described herein. In each iteration of the optimization, the secure, distributed transaction ledger waits until it receives information from all loads, computes p and broadcasts back to all loads. The potential time differences between each load to complete one iteration of the optimization is negligible compared to the time scale of the load dynamics. Thus, during the potential wait time of the secure, distributed transaction ledger, the load temperatures remain almost constant. To put this into context, one iteration of the optimization problem may take a fraction of a second, while the thermal time constant of a building is typically several minutes up to a few hours.

Figure 9:
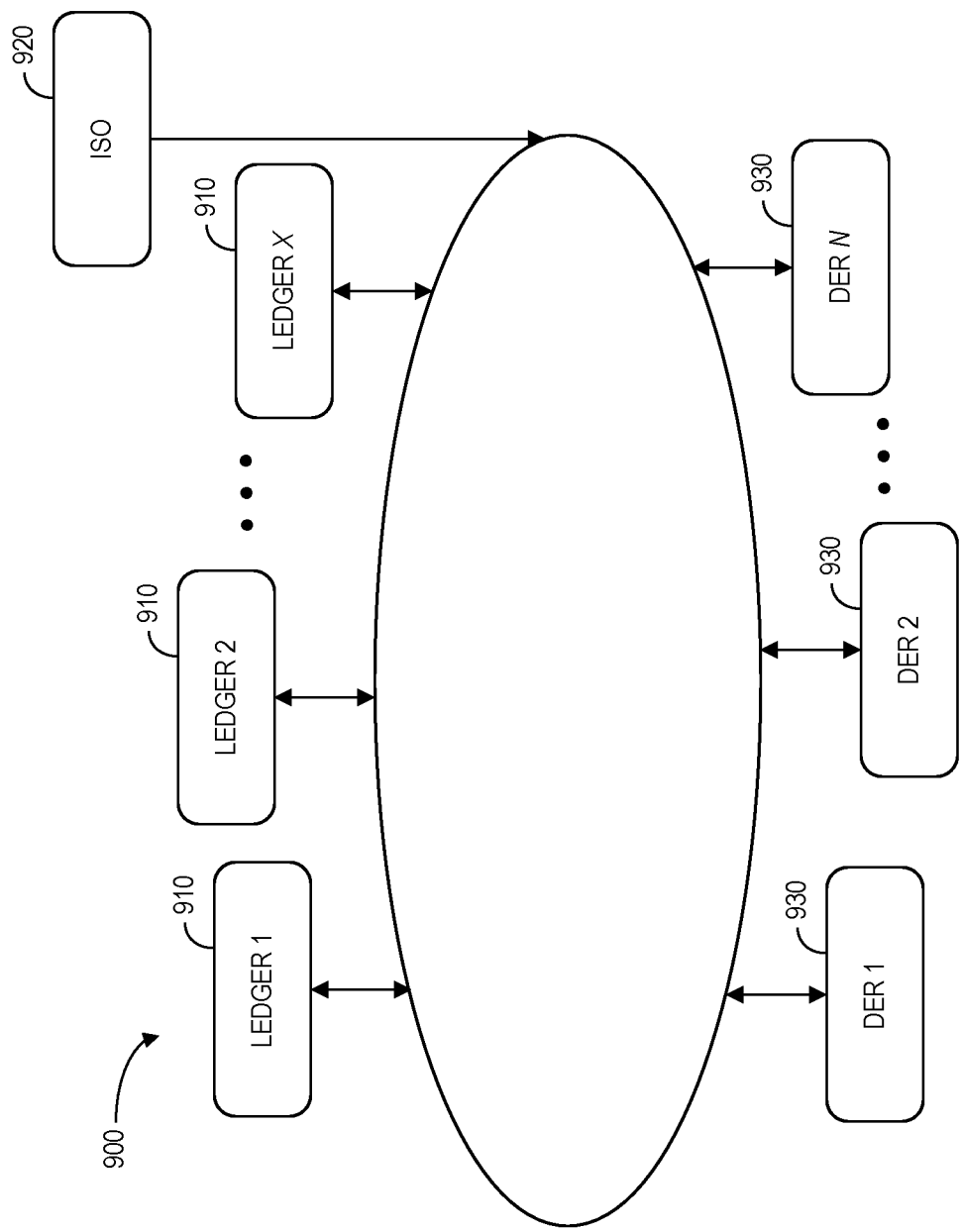
FIG. 9 illustrates a communication structure of loads connected to a blockchain network.

Some embodiments described herein may reduce the cost of enablement by introducing a blockchain-based distributed optimization algorithm. Using blockchain technology, loads and blockchain agents (ledgers) may exchange information such that loads perform primal iterations and the ledgers calculate dual variables corresponding to coupling constraints including power balance constraint. For example, FIG. 9 illustrates a communication structure 900 of DERs 930 (DERs 1 through N as illustrated in FIG. 9) connected to a blockchain network having a number of secure, distributed transaction ledgers 910 (ledgers 1 through X as illustrated in FIG. 9). According to some embodiments, an ISO 920 may also provide information to be utilized by the system. The ledgers 910 may exchange information with DERs 930 to provide scalable, flexible control of distributed DERs in a power grid.

Employing DER flexibility for so many small participants may require new technology—control algorithm and cloud computing—to reduce the otherwise high cost of enablement. Embodiments described herein use blockchain based optimization technology that reduces the cost of enablement, hence making the use and flexibility of a substantial number of small DERs, e.g., residential buildings, feasible.

The blockchain-based distributed optimization scheme may be associated with a network structure where a substantial number of DERs can plug in and optimally be controlled in a distributed fashion such that they cooperatively provide a desired total power consumption determined by the ISO while ensuring that local constraints are met. Blockchain technology provides for easy communication from the DERs to the blockchain cloud along with cheap, distributed computation power enabled by ledgers. The control actions of DERs are determined by real-time optimization where iteration calculations are performed at the DER level and by ledgers distributed in the network. Once the optimization iterations converge, the resulting optimal control action is implemented by each DER. Embodiments may remove the need for any central coordinator among DERs at any layer and therefore reduce the cost of enablement to recruit a large number of small participants. Moreover, the computational cost of the algorithm is distributed among DERs and ledgers, making real-time optimization feasible. The technology might be used, for example, to create an army of blockchain-enabled small DERs that are equipped with an edge optimization algorithm connected to blockchain network. This army of small DERs cooperatively can provide significant DER flexibility for the grid with low enablement cost. The players in this technology include the distributed optimal control algorithm designed to use blockchain for optimization iterations and a fast blockchain theory that enables real-time implementation of the optimal control algorithm.

According to some embodiments, a distributed optimal control algorithm solves the MPC problem that minimizes the aggregated cost of all DERs subject to their local constraints and collective demand constraint. In particular, some embodiments may enjoy relatively fast quadratic convergence. Moreover, the structure does not require a single aggregator at one layer (or different layers) to collect information from DERs and return updated values of Lagrange multipliers to the DERs at each optimization iteration. Instead, embodiments may use blockchain technology (including smart contracts) to remove the need for aggregators at different layers and thus reduce the cost of enablement. Embodiments may provide system resilience while still enabling substantially real-time control because of the relatively fast convergence of the optimization algorithm. Referring again to FIG. 9, DERs 930 perform primal calculations and share minimal necessary information with ledgers 910 to perform dual calculations, and the DERs 930 can download the results from the network and continue optimization iterations.

Figure 10:
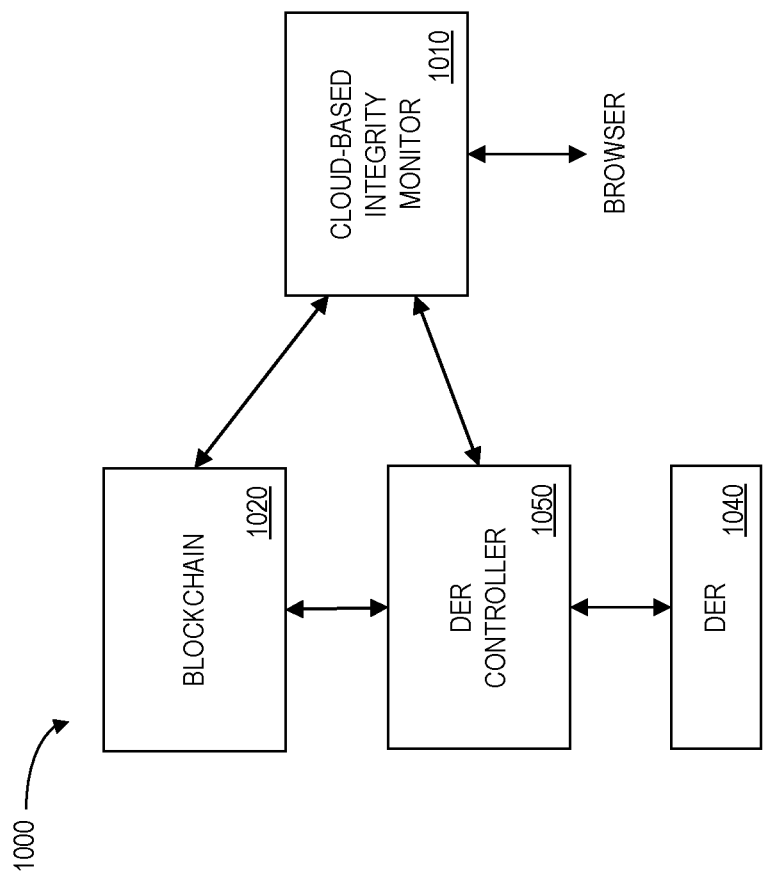
FIG. 10 is a system implementing load balancing with blockchain validation according to some embodiments.
Figure 11:
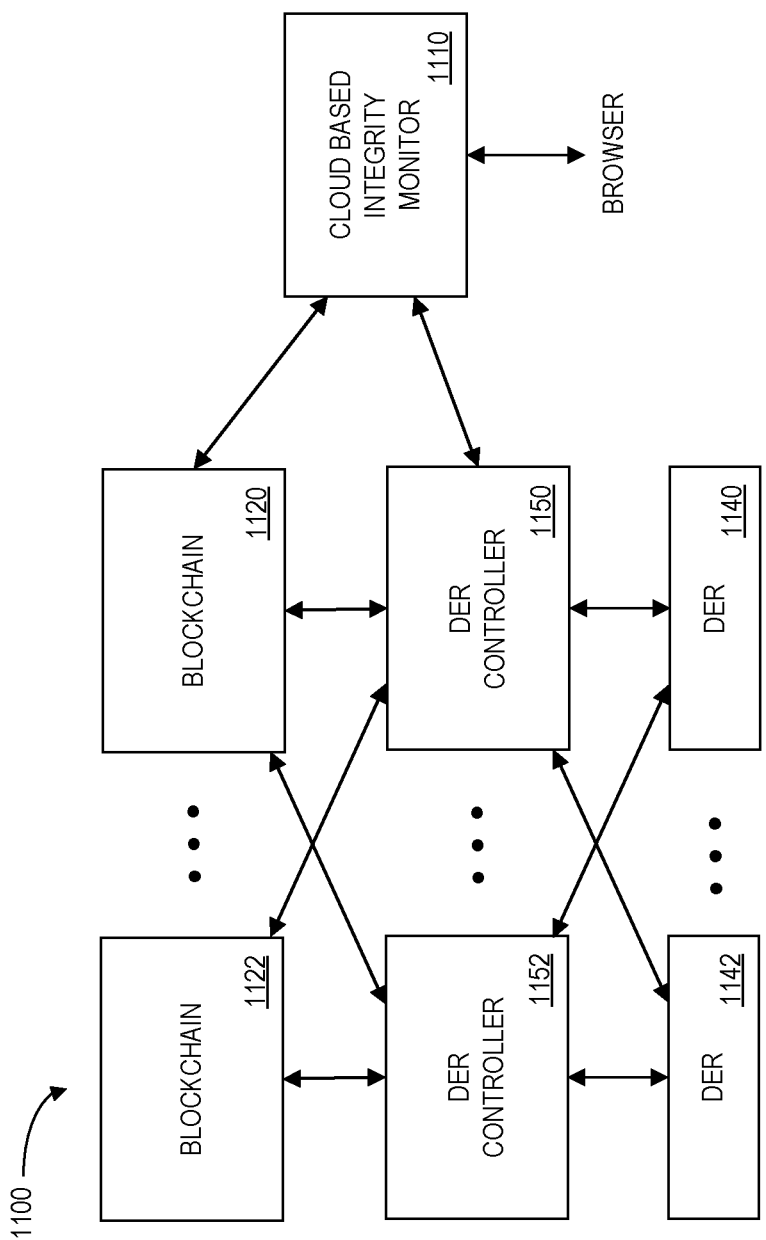
FIG. 11 is a system implementing load balancing with multiple digital transaction engines in accordance with some embodiments.

FIG. 10 is a system 1000 implementing load balancing with blockchain validation according to some embodiments. A cloud-based integrity monitor 1010 may provide transaction integrity data via a web browser and exchange information with a blockchain 1020 and a DER controller 1050 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the DER controller 1050 may be associated with a MySQL database. In this way, the DER controller 1050 and blockchain 1020 can be used to provide transaction level verification associated with a power DER 1040. Although FIG. 10 illustrates a system 1000 with a single blockchain 1020 and DER controller 1050, note that embodiments may employ other topologies. For example, FIG. 11 is a system 1100 implementing DER balancing incorporating multiple blockchains and DER controllers in accordance with some embodiments. In particular, an additional blockchain 1122 and DER controller 1152 may provide protection for associated with multiple DERs 1142. As illustrated in FIG. 11, each DER controller 1150, 1152 may be associated with multiple blockchains 1120, 1122 providing additional protection for the system 1100 (e.g., by storing information at multiple, geographically disperse nodes making attacks impractical). That is, each verifier (e.g., DER controller 1152) may commit a brief summary to an independent data store and, once recorded, the information cannot be changed without detection to provide a tamper-proof System of Records ("SoR").

Figure 12:
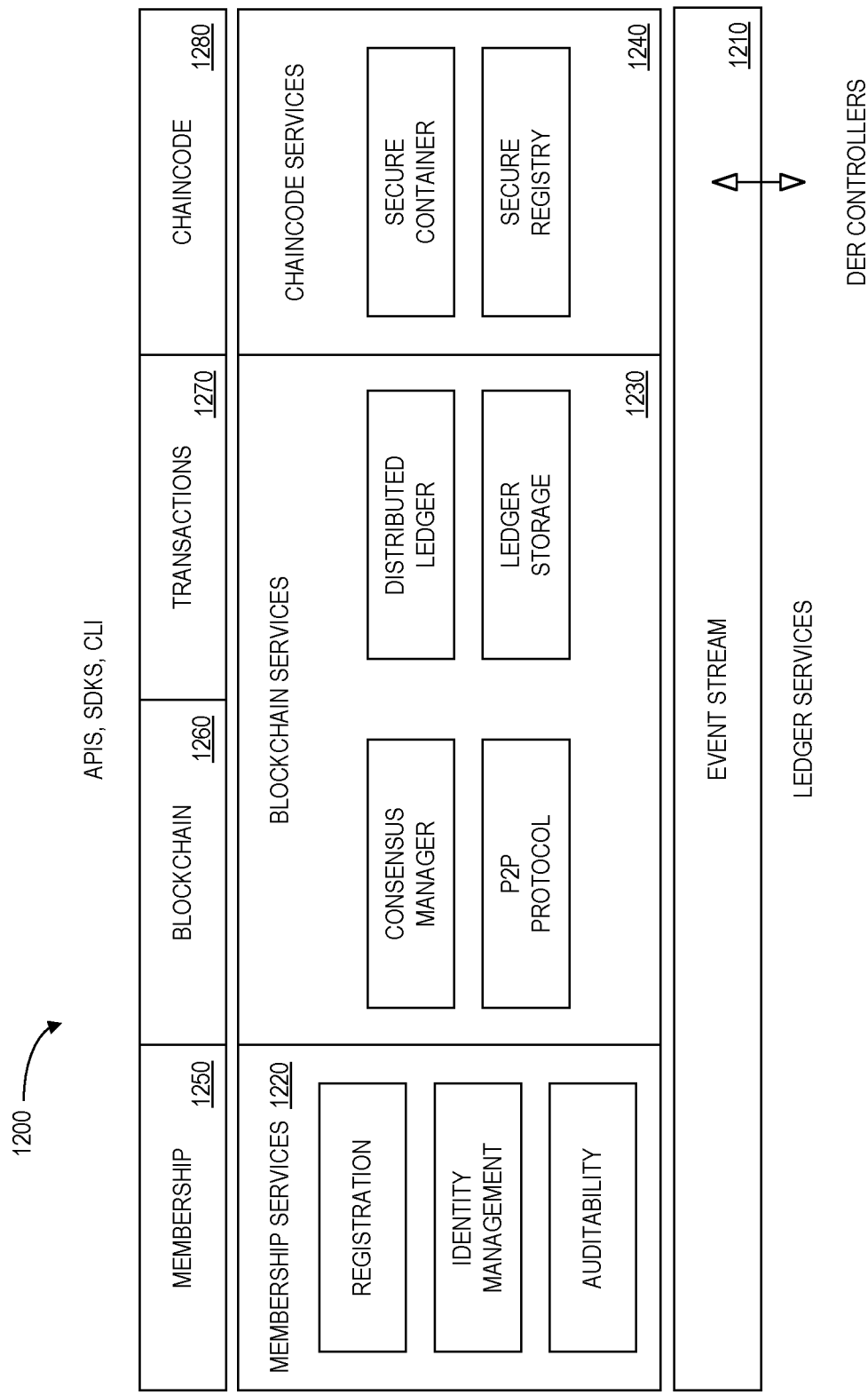
FIG. 12 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 12 is a secure, distributed ledger reference architecture 1200 according to some embodiments. The architecture 1200 includes ledger services and an event stream 1210 that may contain network security service information (e.g., from DER controllers). Membership services 1220 (e.g., including registration, identity managements, and/or an auditability process) may manage identity, privacy, and confidentially for membership 1250 for the network security service. Blockchain services (e.g., including a consensus manager, Peer-to-Peer ("P2P") protocol, a distributed ledger, and/or ledger storage) may manage the distributed ledger through a P2P protocol built on HTTP to maintain a single state that replicated at many nodes to support blockchains 1260 and transactions 1270. Chaincode services 1240 (e.g., secure container and/or a secure registry associated with a smart contract) may help compartmentalize smart contract (or chaincode 1280) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1200.

Figure 13:
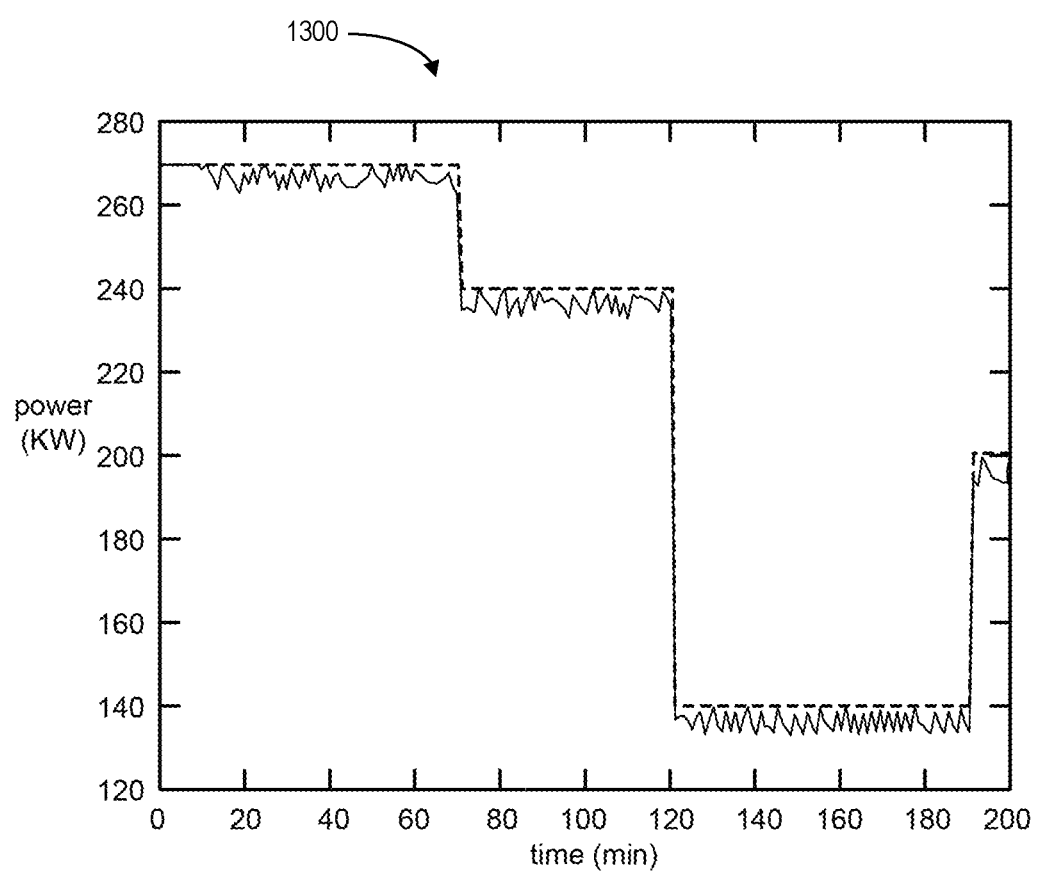
FIG. 13 is an example graph representation of a simulation demonstrating achieved power versus commanded power over time, according to one or more example implementations.

FIG. 13 shows a graph 1300 of the total sum of achieved power the (solid line) versus the commanded power (dashed line) over time. If all active loads (loads available for control) are continuously controllable, the power command will be tracked virtually exactly, materializing the equality constraint (eq. 2). However, in the presence of discrete loads, exact tracking of the power commands may not be possible. Thus, the tracking depends on the number of loads of each type, the parameters of each load, and the commanded power value.

The power tracking requirement in this case is that the total sum of building powers tracks the power command as closely as possible without exceeding the power command. In this example, at each sampling time, first assign the power of discrete loads that are not active, and subtract the sum of power of such subset of loads from the overall power command to get the sum of powers that need to be matched by the active loads (which itself is a mixture of continuous and discrete loads).

Figure 8:
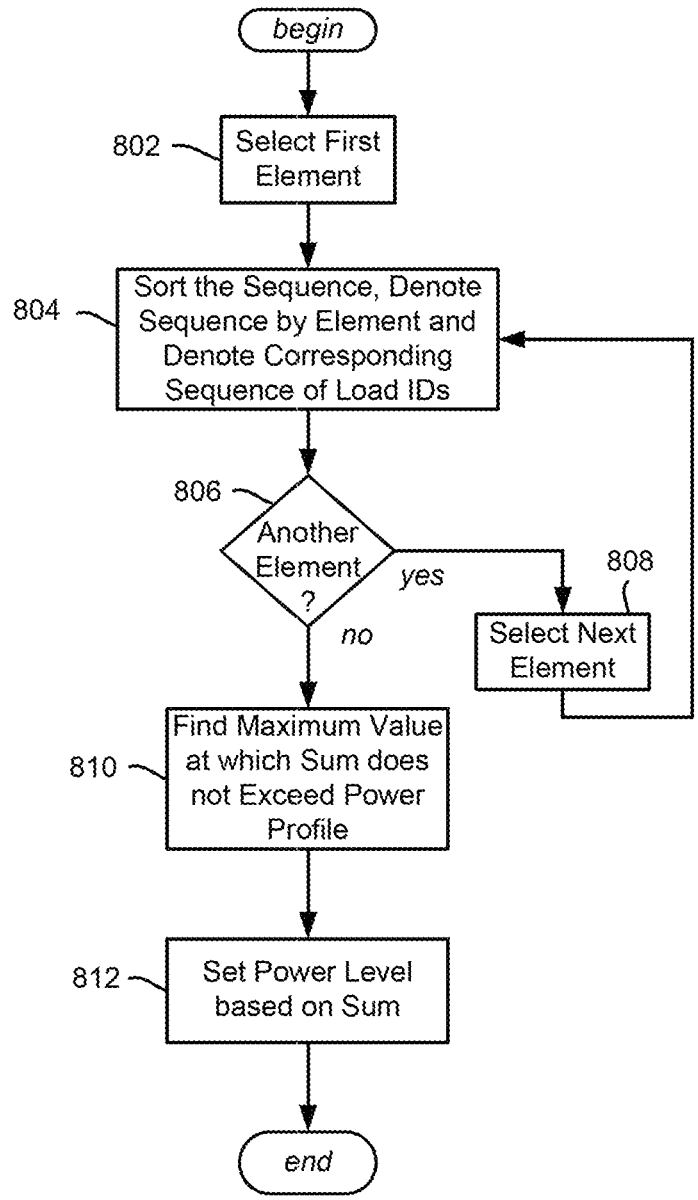
FIG. 8 is a flow diagram showing example operations for controlling a discrete load, according to one or more example implementations.

After solving the optimization problem, the discrete active loads are post-processed using the algorithm described in with reference to FIG. 8. As shown in FIG. 13, the sum of load powers never exceeds the command, which is expected. The RMS value of the relative power tracking error for this simulation is 2.32%. The number of active loads and their individual power set points are automatically computed by the optimization algorithm at each sampling time. Note that at the beginning, the discrete loads are OFF, and because they have to remain OFF to fulfill the hysteresis requirement, at the first four sampling times, only the fifty continuous loads are active.

Figure 14:
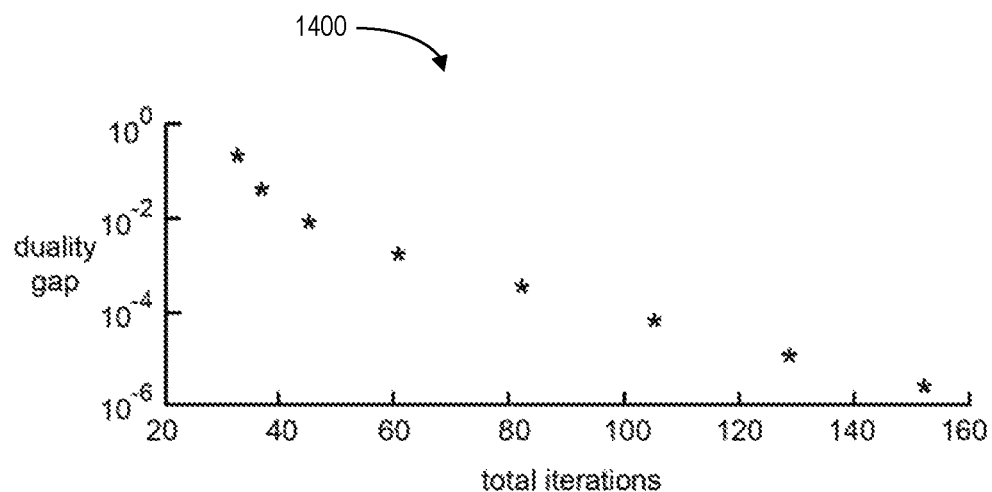
FIG. 14 is an example graph representation of optimizations' duality gap changes over a number of iterations, which may be used to determine sufficient convergence, according to one or more example implementations.
Figure 15:
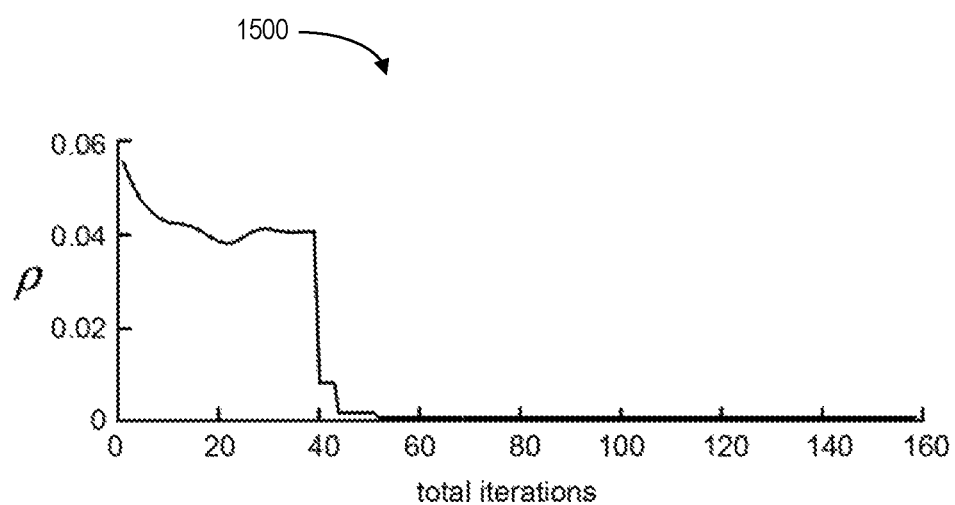
FIG. 15 is an example graph representation of optimizations' Lagrange multiplier value changes over a number of iterations, which may be used to determine sufficient convergence, according to one or more example implementations.

In terms of convergence performance, in graph 1400 of FIG. 14 convergence via the duality gap (the difference between the primal and dual solutions) is shown. In graph 1500 of FIG. 15, the values of p (the Lagrange multiplier associated with power balance) versus the total number of iterations in an optimization problem is shown as solved within one sampling time. The convergence criterion can be established based on either the duality gap or rate of change of $\rho$, for example.

As can be seen, embodiments may provide an optimization algorithm for cooperation of distributed flexible power resources to provide regulation and ramping reserve as an ancillary service. This may facilitate the penetration of renewable energies. The distributed iterative operations make real-time distributed optimization feasible, with the target aggregated power being achieved while not significantly impacting the local operation of the distributed flexible power resources. The scalable optimal flexibility control distributes the computational burden of large scale optimization among loads/nodes while they communicate with the secure, distributed transaction ledger. Embodiments may be relatively efficient and may be implemented via a secure, distributed transaction ledger level with a substantial number of loads. Moreover, because functions are implemented via a secure distributed transaction ledger, embodiments may be scalable (that is, the cost and trouble of having a single entity aggregate all of the data from every load may be avoided). Moreover, the system may be secure because the transaction data is stored at multiple locations (e.g., multiple ledgers).

In addition, some embodiments described herein utilize blockchain technology (including smart contracts) to remove the need for aggregators at different layers, and thus reduce the cost of enablement of the technology and help provide both system resilience and substantially real-time control (because of the relatively fast convergence of the optimization algorithm). Embodiments may enable a plug-and-play cloud-edge configuration enabled by the control algorithm/blockchain.

One or more aspects are directed towards a load controller of distributed load controllers, the load controller coupled to manage a power-consuming load that consumes power supplied via a consumer supply device of a power grid, wherein the load controller manages the load to satisfy the load's quality of service constraint or constraints, and wherein the load controller is communicatively coupled to a secure, distributed transaction ledger that aggregates data sent by the load controller and received from one or more other distributed load controllers of the distributed load controllers, the data comprising initial data that comprises a power range. In one or more aspects, the load controller is configured to receive an initial ratio value from the secure, distributed transaction ledger, wherein the initial ratio value is based on the power range and other power range data from the one or more other distributed load controllers of the distributed load controllers, and wherein the load controller is further configured to use the initial ratio value to set a local control action level to an initial level, and use load-specific information of the power-consuming load to determine condensed information comprising one or more scalar or vector values that represent the load-specific information in a more compact form than the load-specific information, and to communicate the condensed information to the secure, distributed transaction ledger, wherein the local control action level is local to the load controller. In one or more aspects, the load controller is further configured to perform iterations based on communication with the secure, distributed transaction ledger to update local optimization variables, including variables defining control actions, until the secure, distributed transaction ledger determines that the iterations have satisfied a defined condition, and wherein the iterations are performed to receive a step size value and a global value from the secure, distributed transaction ledger, wherein the step size value and the global value are calculated based on the condensed information and other condensed information from the one or more other distributed load controllers of the distributed load controllers, determine a step direction, control the power-consuming load with an adjustment based on the step size value and the step direction to approach optimal control values satisfying the specified aggregated load power consumption level, re-determine updated condensed information that updates the condensed information and comprises one or more updated scalar or vector values that represent the load-specific information after the adjustment, and communicate the updated condensed information to the secure, distributed transaction ledger.

One or more aspects are directed towards receiving, by a transaction ledger comprising a processor, respective condensed datasets representative of respective load-specific information received from respective load controllers, wherein the respective load controllers are coupled to control a power-consuming load that obtains power from a power grid, and wherein the respective condensed datasets are smaller in size than respective full datasets associated with the respective load controllers, and determining a global value and a step size based on the respective condensed datasets and a specified aggregated control action level. Aspects comprise sending the global value and the step size to the respective load controllers for use in adjusting respective local power consumptions of the respective load controllers to satisfy the specified aggregated control action level, receiving respective updated condensed datasets from the respective load controllers that update the respective condensed datasets, wherein the respective updated condensed datasets are based on the respective load-specific information associated with the power-consuming load of the respective load controllers after the adjusting of the respective local power consumptions in respective step directions determined by the respective load controllers, and determining, from the respective updated condensed datasets, whether the respective load controllers have satisfied the specified aggregated control action level to a defined extent, and in response to determining that the specified aggregated control action level has not been satisfied to the defined extent. Other aspects comprise determining an updated global value and an updated step size based on the respective updated condensed datasets and the specified aggregated control action level, and sending the updated global value and the updated step size to the respective load controllers for use in further adjusting the respective local power consumptions to satisfy the specified aggregated control action level.

One or more aspects are directed towards communicating load-related power range data to a secure, distributed transaction ledger, wherein the load-related power range data from the load controller and other load-related power range data from one or more other load controllers of the group of distributed load controllers are usable by the secure, distributed transaction ledger to determine initialization data that is to be received by the load controller in response to the communicating of the load-related power range data, and is to be sent to the one or more other load controllers. Further described herein is receiving the initialization data from the secure, distributed transaction ledger, determining condensed load-specific information of a power-consuming load managed by the load controller based at least in part on the initialization data and communicating the condensed load-specific information to the secure, distributed transaction ledger, wherein the condensed load-specific information from the load controller and other condensed load-specific information from the one or more other load controllers are usable by the secure, distributed transaction ledger to determine a step size and a global quantities (e.g., multiplier value) that are to be received by the load controller in response to the communicating of the condensed load-specific information and are to be sent to the one or more other load controllers. One or more aspects comprise receiving the step size and the global quantities from the secure, distributed transaction ledger; based on the step size and the global quantities from the secure, distributed transaction ledger, determining a step direction, adjusting the load power consumption in the step direction, determining current condensed load-specific information after the adjusting of the load power consumption, and communicating the current condensed load-specific information to the secure, distributed transaction ledger, wherein the current condensed load-specific information from the load controller and other current condensed load-specific information from the one or more other load controllers are usable by the secure, distributed transaction ledger to evaluate whether aggregated control action levels of the group of distributed load controllers have converged to a defined convergence level, and in response to the aggregated control action levels being determined not to have converged to the defined convergence level, determining a new step size that replaces the step size and a new global quantity that replaces the global quantity based on the current condensed load-specific information and the other current load-specific information, and wherein the new step size and the new global quantity are to be received by the load controller and/or sent to the other load controllers. One or more other aspects may comprise receiving the new step size and the new global quantity, and in response to the aggregated control action levels being determined to have converged to the defined convergence level, ending the operations until a later time.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Accordingly, the invention is not to be limited to any single implementation, but rather is to be construed in breadth, spirit and scope in accordance with the appended claims.

What is claimed is:
1. A system, comprising:
 a Distributed Energy Resource ("DER") controller of distributed DER controllers, the DER controller coupled to manage a power-exchanging DER associ- ated with a power grid, wherein the DER controller manages the DER to satisfy a DER quality of service constraint or constraints, wherein the DER controller is communicatively coupled to a secure, distributed transaction ledger that receives data sent by the DER controller and received from one or more other distributed DER controllers of the distributed DER controllers, the data comprising initial data that comprises a power range, wherein the DER controller is configured to receive an initial ratio value from the secure, distributed transaction ledger, wherein the initial ratio value is based on the power range and other power range data from the one or more other distributed DER controllers of the distributed DER controllers, wherein the DER controller is further configured to use the initial ratio value to set a local control action level to an initial level, and use DER-specific information of the power-exchanging DER to determine condensed information comprising one or more scalar or vector values that represent the DER-specific information in a more compact form than the DER-specific information, and to communicate the condensed information to the secure, distributed transaction ledger, wherein the local control action level is local to the DER controller, wherein the DER controller is further configured to perform iterations based on communication with the secure, distributed transaction ledger to update local optimization variables, including variables defining control actions, until the secure, distributed transaction ledger determines that the iterations have satisfied a defined condition, and wherein the iterations are performed to:
  receive a step size value and a global value from the secure, distributed transaction ledger, wherein the step size value and the global value are calculated based on the condensed information and other condensed information from the one or more other distributed DER controllers of the distributed DER controllers,
  determine a step direction,
  control the power-exchanging DER with an adjustment based on the step size value and the step direction to approach optimal control values satisfying the local control action level,
  re-determine updated condensed information that updates the condensed information and comprises one or more updated scalar or vector values that represent the DER-specific information after the adjustment, and
  communicate the updated condensed information to the secure, distributed transaction ledger.

2. The system of claim 1, wherein the secure, distributed transaction ledger comprises blockchain technology.

3. The system of claim 1, wherein the power-exchanging DER consumes power from the power grid and is associated with at least one of: (i) a consumer device associated with a power load, (ii) a heating, ventilation, and air conditioning system, (iii) an electric vehicle, and (iv) a battery.

4. The system of claim 1, wherein the power-exchanging DER produces power for the power grid and is associated with at least one of: (i) a consumer device associated with a power load, (ii) a photovoltaic panel, (iii) a wind turbine, and (iv) a battery.

5. The system of claim 1, wherein the local control action level is a power level.

6. The system of claim 5, wherein said determination that the iterations have satisfied the defined condition comprises determining that estimated optimal control values have converged to an optimal value such that power balance constraint is achieved at the estimated optimal control values.

7. The system of claim 5, wherein the DER controller manages a continuously controllable load, or wherein the DER controller manages a discrete load and wherein the DER controller is configured to perform discrete load post-processing on the local control action level to manage the discrete load.

8. The system of claim 1, wherein each iteration to control the power-exchanging DER attempts to satisfy one or more quality of service constraints of the power-exchanging DER.

9. The system of claim 1, wherein the power range comprises a minimum feasible value for power exchange by the power-exchanging DER and a maximum feasible value for power exchange by the power-exchanging DER.

10. The system of claim 1, wherein the global value comprises a Lagrange multiplier, wherein the iterations comprise Newton iterations, wherein the step size value is determined as a Newton step, and wherein the step direction is determined as a Newton search direction.

11. The system of claim 1, wherein the step size value being iteratively determined and received from the secure, distributed transaction ledger enables a quadratic convergence to the local control action level.

12. The system of claim 1, wherein the DER controller comprises a heating, ventilation and air conditioning control system of: a single zone, a multiple zone building with a building managements system or a multiple zone building without a building managements system.

13. The system of claim 1, wherein the condensed information comprises a scalar or vector value representative of a sensitivity of power with respect to the global value.

14. The system of claim 1, wherein the condensed information comprises a scalar or vector value representative of an optimal or a more optimal change of power once the global value is zero.

15. The system of claim 1, wherein the condensed information comprises a scalar or vector value representative of a sensitivity of a local search direction with respect to the global value.

16. The system of claim 1, wherein the condensed information comprises a scalar or vector value representative of a local search direction once the global value is zero.

17. A method, comprising:
  receiving, by a system comprising processors associated with plurality of ledgers together forming a secure, distributed transaction ledger, respective condensed datasets representative of respective Distributed Energy Resource ("DER")-specific information received from respective load controllers, wherein respective DER controllers are coupled to control a power-exchanging DER associated with a power grid, and wherein the respective condensed datasets are smaller in size than respective full datasets associated with the respective DER controllers;
  determining a global value and a step size based on the respective condensed datasets and a specified aggregated control action level;
  sending the global value and the step size to the respective DER controllers for use in adjusting respective local power consumptions of the respective DER controllers to satisfy the specified aggregated control action level;

receiving respective updated condensed datasets from the respective DER controllers that update the respective condensed datasets, wherein the respective updated condensed datasets are based on the respective DER-specific information associated with the power-exchanging DER of the respective DER controllers after the adjusting of the respective local power consumptions in respective step directions determined by the respective DER controllers; and determining, from the respective updated condensed datasets, whether the respective DER controllers have satisfied the specified aggregated control action level to a defined extent, and in response to determining that the specified aggregated control action level has not been satisfied to the defined extent:

determining an updated global value and an updated step size based on the respective updated condensed datasets and the specified aggregated control action level, and sending the updated global value and the updated step size to the respective DER controllers for use in further adjusting the respective local power consumptions to satisfy the specified aggregated control action level.

18. The method of claim 17, wherein the secure, distributed transaction ledger comprises blockchain technology.

19. The method of claim 17, further comprising, initializing the respective DER controllers, including receiving power ranges from the respective DER controllers, determining respective initial ratio values from the power ranges, and sending the respective initial ratio values to the respective DER controllers.

20. The method of claim 17, wherein the determining the step size based on the respective condensed datasets comprises determining a Newton step, wherein the method further comprises determining a Newton decrement value, and wherein the determining whether the respective DER controllers have satisfied the specified aggregated control action level to the defined extent comprises comparing the Newton decrement value to a defined convergence level.

21. A non-transitory, machine-readable storage medium, comprising executable instructions that, when executed by a load controller of a group of Distributed Energy Resource ("DER") controllers, facilitate performance of operations, comprising:

communicating load-related power range data to a secure, distributed transaction ledger, wherein the load-related power range data from the DER controller and other load-related power range data from one or more other DER controllers of the group of distributed DER controllers are usable by the secure, distributed transaction ledger to determine initialization data that is to be received by the DER controller in response to the communicating of the load-related power range data, and is to be sent to the one or more other DER controllers;

receiving the initialization data from the secure, distributed transaction ledger;

determining condensed DER-specific information of a power-exchanging load managed by the DER controller based at least in part on the initialization data;

communicating the condensed DER-specific information to the secure, distributed transaction ledger, wherein the condensed DER-specific information from the DER controller and other condensed DER-specific information from the one or more other DER controllers are usable by the secure, distributed transaction ledger to determine a step size and a global quantity that are to be received by the DER controller in response to the communicating of the condensed DER-specific information and are to be sent to the one or more other DER controllers;

receiving the step size and the global quantity from the secure, distributed transaction ledger;

based on the step size and the global quantity from the secure, distributed transaction ledger, determining a step direction, adjusting the power-exchanging load in the step direction, determining current condensed DER-specific information after the adjusting of the power-exchanging load, and communicating the current condensed DER-specific information to the secure, distributed transaction ledger, wherein the current condensed DER-specific information from the DER controller and other current condensed DER-specific information from the one or more other DER controllers are usable by the secure, distributed transaction ledger to evaluate whether aggregated control action levels of the group of distributed DER controllers have converged to a defined convergence level, and in response to the aggregated control action levels being determined not to have converged to the defined convergence level, determining a new step size that replaces the step size and a new global quantity that replaces the global quantity based on the current condensed DER-specific information and the other current DER-specific information, and wherein the new step size and the new global quantity are to be received by the DER controller and sent to the other DER controllers;

receiving the new step size and the new global quantity; and in response to the aggregated control action levels being determined to have converged to the defined convergence level, ending the operations until a later time.

22. The non-transitory, machine-readable storage medium of claim 21, wherein the secure, distributed transaction ledger comprises blockchain technology.

23. The non-transitory, machine-readable storage medium of claim 21, wherein the determining the current condensed DER-specific information from the DER controller at the secure, distributed transaction ledger comprises determining at least one of: a value representative of a sensitivity of power with respect to the global quantity, a value representative of an optimal or a more optimal change of power once the global quantity is zero, a value representative of a sensitivity of a local search direction with respect to the global quantity, or a value representative of a local search direction once the global quantity is zero.

24. The machine-readable storage medium of claim 21, wherein the receiving the initialization data by the DER controller comprises receiving a power ratio vector by the DER controller, and wherein the DER controller initializes a power vector based at least in part on the power ratio vector and the load-related power range data.

* * * * *